(12) United States Patent
Matsumura et al.

(10) Patent No.: US 11,552,757 B2
(45) Date of Patent: Jan. 10, 2023

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 118 days.

(21) Appl. No.: 16/764,179

(22) PCT Filed: Nov. 16, 2017

(86) PCT No.: PCT/JP2017/041312
§ 371 (c)(1),
(2) Date: May 14, 2020

(87) PCT Pub. No.: WO2019/097638
PCT Pub. Date: May 23, 2019

(65) Prior Publication Data
US 2020/0389271 A1    Dec. 10, 2020

(51) Int. Cl.
H04W 4/00    (2018.01)
H04L 5/00    (2006.01)
(52) U.S. Cl.
CPC ................................. H04L 5/0048 (2013.01)
(58) Field of Classification Search
CPC .................................................. H04L 5/0048
USPC ........................................................ 370/329
See application file for complete search history.

(56) References Cited

U.S. PATENT DOCUMENTS

2014/0321421 A1    10/2014    Popovic et al.
2018/0198568 A1    7/2018    Takeda et al.

FOREIGN PATENT DOCUMENTS

| CA | 2774419 A1 * | 3/2011 | ......... H04L 27/2605 |
| EP | 2740248 A2 * | 6/2014 | ........... H04L 5/0035 |
| WO | 2013104425 A1 | 7/2013 | |
| WO | WO-2013176414 A1 * | 11/2013 | ............. H04B 7/024 |
| WO | 2016/182063 A1 | 11/2016 | |
| WO | 2017054876 A1 | 4/2017 | |
| WO | WO-2018128870 A2 * | 7/2018 | ........... H04L 5/0051 |

OTHER PUBLICATIONS

Samsung (R1-166713, "Remaining details on DMRS", Gothenburg, Sweden Aug. 22-26, 2016) (Year: 2016).*
A. LG electronics ( R1-166821, "Remaining details on DMRS for PSCCH and PSSCH", Gothenburg, Sweden, Aug. 22-26, 2016). (Year: 2016).*
Office Action issued in Russian Application No. 2020119166/07; dated Feb. 11, 2021 (13 pages).
Extended European Search Report issued in counterpart European Patent Application No. 17932093.2, dated Jun. 7, 2021 (8 pages).

(Continued)

Primary Examiner — Maharishi V Khirodhar
(74) Attorney, Agent, or Firm — Osha Bergman Watanabe & Burton LLP

(57) ABSTRACT

A terminal is disclosed including a processor that generates a sequence for a demodulation reference signal based on a symbol index and a slot index. The terminal further includes a transmitter that transmits the demodulation reference signal. In other aspects, a radio communication method and a base station are also disclosed.

4 Claims, 13 Drawing Sheets

(56) References Cited

OTHER PUBLICATIONS

Samsung; "Remaining details on DMRS"; 3GPP TSG RAN WG1 #86, R1-166713; Gothenburg, Sweden; Aug. 22-26, 2016 (3 pages).
3GPP TS 36.300 V8.12.0 "3rd Generation Partnership Project; Technical Specification Group Radio Access Network Evolved Universal Terrestrial Radio Access (E-UTRA) and Evolved Universal Terrestrial Radio Access Network (E-UTRAN); Overall description; Stage 2 (Release 8)" Mar. 2010 (149 page).
3GPP TSG TSG RAN WG1 Meeting NR#3; R1-1716632 "Discussion on Short PUCCH for UCI of up to 2 bits" Wilus Inc.; Nagoya, Japan; Sep. 18-21, 2017 (4 pages).
3GPP TSG RAN WG1 Meeting #90bis; R1-1717068 "Short PUCCH over 2 OFDM symbols" Prague, Czech Republic; Oct. 9-13, 2017 (2 pages).
3GPP TSG RAN WG1 Meeting #NR-AdHoc3; R1-1716421 "Channelization of 2-symbol short PUCCH" Qualcomm Incorporated;; Nagoya, Japan; Sep. 18-21, 2017 (4 pages).
3GPP TSG RAN WG1 Meeting#90bis; R1-1718634 "On the Design of 2-Symbol PUCCH" Ericsson; Prague, Czech Republic; Oct. 9-13, 2017 (3 pages).
3GPP TSG RAN WG1 Meeting NR#3; R1-1716312 "2-symbol NR PUCCH" Intel Corporation; Nagoya, Japan Sep. 18-21, 2017 (5 pages).
3GPP TSG RAN WG1 Meeting 90bis; R1-1717491 "Support of short-PUCCH over 2 OFDM symbols" vivo; Prague, CZ; Oct. 9-13, 2017 (4 pages).
3GPP TS 36.211 V14.0.0 "3rd Generation Partnership Project; Technical Specification Group Radio Access Network; Evolved Universal Terrestrial Radio Access (E-UTRA); Physical channels and modulation (Release 14)" Sep. 2016 (6 pages).
International Search Report issued in International Application No. PCT/JP2017/041312, dated Feb. 6, 2018 (5 pages).
Written Opinion issued in International Application No. PCT/JP2017/041312; dated Feb. 6, 2018 (5 pages).
3GPP TSG RAN WG1 Meeting #85; R1-164125 "PUSCH DM-RS and support of symbol-level combining" Intel Corporation; Nanjing, China; May 23-27, 2016 (4 pages).
Office Action issued in Japanese Application No. 2019-554118; dated Jan. 18, 2022 (8 pages).
Office Action issued in Korean Application No. 10-2020-7015389; dated Jan. 21, 2022 (8 pages).
Office Action issued in Indian Application No. 202037024919; dated Mar. 22, 2022 (6 pages).

\* cited by examiner

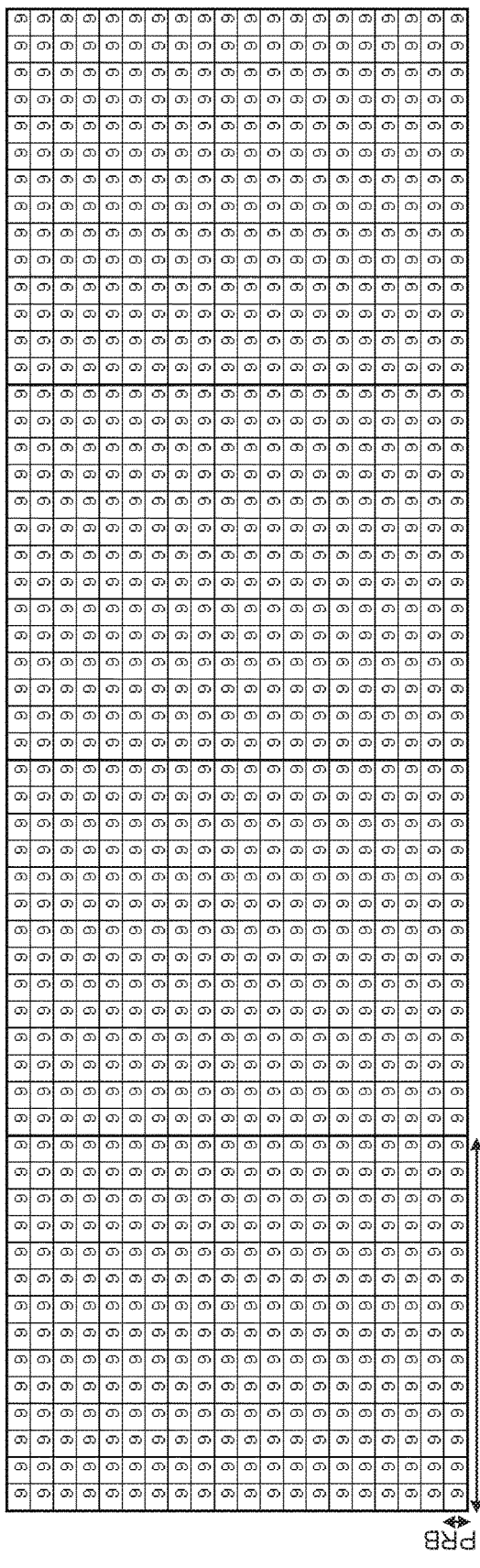

| PUCCH FORMAT | NUMBER OF SYMBOLS | NUMBER OF BITS |
|---|---|---|
| 0 | 1-2 | ≤2 |
| 1 | 4-14 | ≤2 |
| 2 | 1-2 | >2 |
| 3 | 4-14 | >N |
| 4 | 4-14 | >2, <N |

FIG. 7

TERMINAL, RADIO COMMUNICATION METHOD, AND BASE STATION

CROSS-REFERENCE TO RELATED APPLICATIONS

This application is a national phase application of PCT/JP2017/041312, filed on Nov. 16, 2017. The contents of this application are hereby incorporated by reference in their entirety.

TECHNICAL FIELD

The present invention relates to a user terminal and a radio communication method in next-generation mobile communication systems.

BACKGROUND ART

In the UMTS (Universal Mobile Telecommunications System) network, the specifications of Long Term Evolution (LTE) have been drafted for the purpose of further increasing high speed data rates, providing lower latency, and so on (see Non-Patent Literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+(plus)," "NR (New RAT (New Radio Access Technology))," "LTE Rel. 14," "LTE Rel. 15 (or later versions)," and so on).

In existing LTE systems (for example, LTE Rel. 13 or earlier), downlink (DL) and/or uplink (UL) communications are carried out, using a transmission time interval (TTI) (also referred to as "subframe" and so on) of 1 ms. This TTI of 1 ms is a unit of time to transmit one data packet that is channel-encoded, and is a processing unit in scheduling, link adaptation, retransmission control (HARQ-ACK (Hybrid Automatic Repeat reQuest-Acknowledge)), and so on. The TTI of 1 ms includes two slots.

In the existing LTE systems, a radio base station demodulates a UL channel (including a UL data channel (for example, a PUSCH (Physical Uplink Shared Channel)) and/or a UL control channel (for example, a PUCCH (Physical Uplink Control Channel))), based on results of channel estimation of a demodulation reference signal (DMRS).

In the existing LTE systems, a user terminal multiplexes a UL channel and a DMRS and transmits the multiplexed result within the TTI of 1 ms. Within the TTI of 1 ms, a plurality of DMRSs of different layers of the same user terminal (or different user terminals) are orthogonally multiplexed by using cyclic shift (CS) and/or orthogonal spreading code (for example, orthogonal cover code (OCC)).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, LTE Rel. 14 or Rel. 15, 5G, NR, and so on), introduction of a TTI (for example, a TTI shorter than a TTI of 1 ms (also referred to as a short TTI, an sTTI, a second TTI, a slot, a mini-slot, and so on)) that has a different time length than the TTI of 1 ms (also referred to as a subframe, a first TTI, a slot, and so on) in the existing LTE systems is under study.

In the existing LTE systems (for example, LTE Rel. 13 or earlier), inter-cell interference is reduced by causing hopping of a base sequence of a DMRS for a UL channel (DMRS sequence) per slot within a subframe of 1 ms (for example, sequence group hopping (SGH) (also simply referred to as group hopping), or sequence hopping, and so on).

However, in the existing LTE systems, application of hopping of a DMRS sequence is controlled on the premise of a TTI of 1 ms. On the other hand, in the future radio communication systems, DMRS mapping performed utilizing an sTTI unit (for example, every symbol or every several symbols), which is shorter than a TTI of 1 ms, is under study.

In the future radio communication systems, mapping of a PUCCH (sPUCCH), application of sequence-based PUCCH (or sequence-based transmission), and so on with the use of one or more symbols are also under study. Therefore, in the future radio communication systems, how a sequence (or sequence hopping) to be applied to a DMRS and/or a PUCCH is controlled presents a problem.

The present invention has been made in the light of such a problem, and has one object to provide a user terminal and a radio communication method that allow appropriate configuration of a sequence to be applied to a DMRS and/or a PUCCH in future radio communication systems.

Solution to Problem

One aspect of a user terminal of the present invention includes: a transmitting section that transmits a demodulation reference signal and/or an uplink control channel; and a control section that controls a predetermined sequence to be applied to the demodulation reference signal and/or the uplink control channel, based on at least a symbol index and/or a frequency resource index.

Advantageous Effects of Invention

According to the present invention, a sequence to be applied to a DMRS and/or a PUCCH can be appropriately configured in future radio communication systems.

BRIEF DESCRIPTION OF DRAWINGS

FIGS. 2A and 2B are diagrams to show examples of group number indexes corresponding to respective radio resources;

FIGS. 3A and 3B are diagrams to show other examples of group number indexes corresponding to respective radio resources;

FIGS. 4A and 4B are diagram to show other examples of group number indexes corresponding to respective radio resources;

FIG. 5 is a diagram to show an example of CS indexes corresponding to respective radio resources;

FIG. 7 is a diagram to show an example of PUCCH formats to which the present embodiment is applied;

DESCRIPTION OF EMBODIMENTS

Figure 1A:
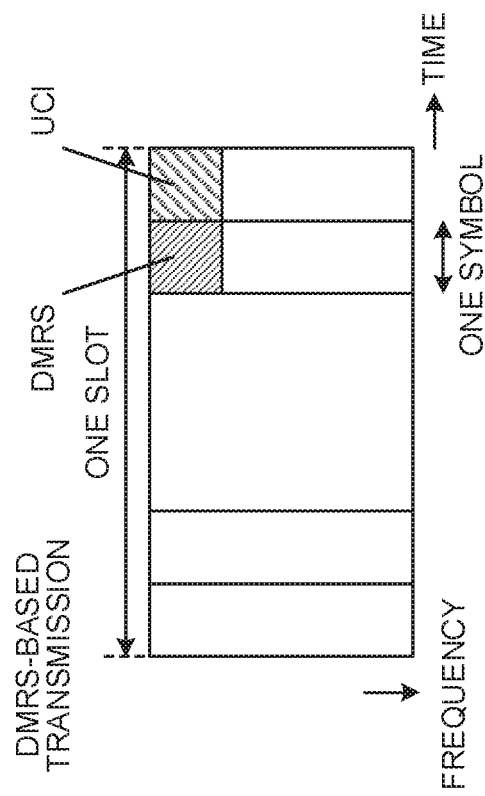
FIGS. 1A and 1B are diagrams to show examples of a PUCCH configuration.

In the existing LTE systems (for example, LTE Rel.13 or earlier), two slots are provided within a TTI of 1 ms. A DMRS used to demodulate a PUSCH is mapped to one symbol of each slot (two symbols within a TTI of 1 ms). As a base sequence of a DMRS (also referred to as a DMRS sequence and so on), for example, a sequence based on Zadoff-chu (ZC) is used.

In the existing LTE systems, the number of DMRS sequences is set to 30 or 60, depending on a bandwidth. For example, the number of DMRS sequences is 30 if the bandwidth is equal to or less than five physical resource blocks (PRBs, also referred to as resource blocks (RBs), and so on), and is 60 if the bandwidth is equal to or more than six PRBs.

In the existing LTE systems, if the bandwidth is equal to or less than five PRBs, the 30 DMRS sequences are identified by group numbers (u=0 to 29) (also referred to as group indexes and so on). If the bandwidth is equal to or more than six PRBs, the 60 DMRS sequences are identified by group numbers (u=0 to 29) and base sequence numbers (v=0, 1) (also referred to as sequence indexes and so on).

If the same DMRS sequences are used among a plurality of user terminals in different cells, transmission signals from each of the plurality of user terminals interfere with each other. In view of this, to prevent the DMRS sequences from being continuously the same among the plurality of user terminals, the DMRS sequences are hopped every slot within a TTI of 1 ms. For example, in the existing LTE systems, two types of hopping schemes (sequence group hopping and sequence hopping) are used.

In sequence group hopping (SGH, also simply referred to as group hopping), the above group numbers (u) are hopped per slot within a TTI of 1 ms. In SGH, the group number (u) of each slot is determined based on a hopping pattern ($f_{gh}$) and a sequence shift pattern ($f_{ss}$). The hopping pattern and/or the sequence shift pattern may be based on a physical cell ID (cell ID) or a virtual cell ID. A user terminal may be informed of a physical cell ID by means of a sequence number of a synchronization signal (PSS/SSS), and may be informed of a virtual cell ID by means of RRC signaling. Note that, in the existing LTE systems, for example, 17 hopping patterns and 30 sequence shift patterns are used.

In contrast, in sequence hopping, the above base sequence numbers (v) are hopped per slot within one TTI. The base sequence number (v) of each slot is determined based on a physical cell ID or a virtual cell ID. Sequence hopping is applied when the bandwidth is equal to or more than six PRBs, and is not used in conjunction with SGH (when SGH is applied, v is configured to 0 (v=0)).

As described above, in the existing LTE systems, to randomize inter-cell interference, SGH or sequence hopping can be applied to the DMRS sequences.

Incidentally, for the future radio communication systems, the support of a UL control channel (hereinafter also referred to as a short PUCCH) having a short duration that is shorter than that of a PUCCH (Physical Uplink Control Channel) format of the existing LTE systems (for example, LTE Rel.8 to Rel. 13), and/or a UL control channel (hereinafter also referred to as a long PUCCH) having a long duration that is longer than the short duration is under study.

The short PUCCH (shortened PUCCH) is mapped to one or more symbols. In the short PUCCH, uplink control information (UCI) and a reference signal (RS) may be time-division-multiplexed (TDM), or may be frequency-division-multiplexed (FDM). The RS may be, for example, a demodulation reference signal (DMRS) used to demodulate UCI.

As transmission schemes of the short PUCCH, DMRS-based transmission (or DMRS-based PUCCH) in which a UL signal obtained by TDM/FDM of a DMRS and UCI is transmitted to report the UCI, and sequence-based transmission (or sequence-based PUCCH) in which a UL signal using a code resource associated with a value of UCI without the use of a DMRS is transmitted to report the UCI are under study.

Figure 1B:
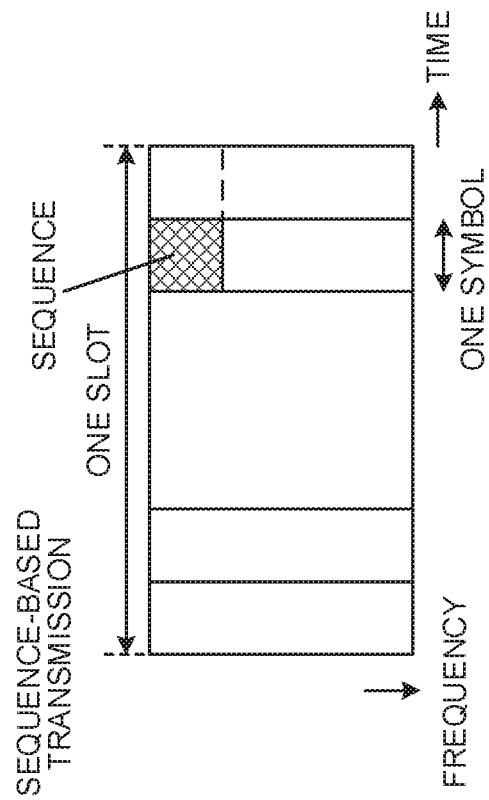

With reference to FIGS. 1A and 1B, the DMRS-based transmission and the sequence-based transmission will be described.

FIG. 1A is a diagram to show an example of DMRS-based transmission using two symbols. In this example, a specific bandwidth of the last two symbols within a slot is allocated to a PUCCH. In the PUCCH, a DMRS of a first symbol and UCI of a second symbol are multiplexed in TDM.

FIG. 1B is a diagram to show an example of sequence-based transmission using one symbol. In this example, the same time/frequency resources as those of the DMRS of the DMRS-based transmission are allocated to a PUCCH of sequence-based transmission. In this case, of the time/frequency resources of the DMRS-based transmission, only the first symbol may be used, and the second symbol may not be used.

For example, the PUCCH of the sequence-based transmission can be generated by applying a sequence (for example, a base sequence) similar to the DMRS. In the sequence-based transmission, a UL signal using code resources each associated with a value of UCI is transmitted. The code resources are resources that can be used for code division multiplexing (CDM), and may be at least one of a base sequence, cyclic shift (phase rotation amount), and OCC (Orthogonal Cover Code).

In this manner, in the future radio communication systems, a case where a PUCCH and/or a DMRS is allocated to each UE per symbol (for example, per symbol and per PRB) is also assumed. In this case, allocation of a DMRS and/or a PUCCH for UL per symbol and/or per frequency resource is controlled. As a contrast, in this case, if a DMRS and/or a PUCCH is generated by applying a sequence considering only a slot unit as in the existing LTE systems, inter-cell interference and the like may be increased.

In view of this, the inventors of the present invention have focused on a point that a DMRS and/or a PUCCH is mapped per symbol and/or per frequency resource, and arrived at the idea of controlling a predetermined sequence to be applied to a DMRS and/or a PUCCH (for example, determining an index of a predetermined sequence), based on at least a symbol index and/or a frequency resource index, as one aspect of the present invention. Note that the frequency resource index may be a resource block (PRB) index and/or a resource element (RE) index. The predetermined sequence may be a base sequence.

In the existing systems, to orthogonalize DMRSs among a plurality of UEs within the same cell, cyclic shift (CS) is applied to predetermined sequences (for example, base sequences and/or reference signal sequences). The inventors of the present invention have focused on a point that a DMRS and/or a PUCCH is mapped per symbol and/or per frequency resource, and arrived at the idea of controlling a CS index to be applied to a predetermined sequence, based on at least a symbol index and/or a frequency resource index, as one aspect of the present invention.

The present embodiment will be described below in detail. Aspects of the embodiment described below may be applied individually, or may be applied in combination. In the present embodiment, a predetermined sequence can be used as at least one of a sequence to be used to generate a PUCCH (for example, a sequence-based PUCCH and/or a DMRS-based PUCCH), a DMRS sequence for a PUCCH, and a DMRS sequence for a PUSCH. For example, the predetermined sequence can be used as a sequence (for example, a base sequence) of a predetermined PUCCH format (for example, PUCCH format 0), a DMRS sequence for a PUCCH, a base sequence of a UCI symbol of a PUCCH, and a DMRS sequence for a PUSCH. As a matter of course, the predetermined sequence may be applied to a sequence of other signals and/or channels. The predetermined sequence may be referred to as a base sequence, a reference signal sequence, or a demodulation reference signal sequence.

In the present embodiment, hopping of predetermined sequences may be hopping of group numbers of the predetermined sequences (also referred to as sequence group hopping (SGH), group hopping, and so on), and/or hopping of base sequence numbers of the predetermined sequences (also referred to as sequence hopping and so on). The hopping of the predetermined sequences only needs to involve the use of different predetermined sequences for each predetermined period (for example, sTTI), and is not limited to the above SGH and/or sequence hopping.

In the present embodiment, the number of predetermined sequences may be the same as or different from that of the existing LTE systems. The predetermined sequence may be identified based on a group number and/or a base sequence number. For example, a UL channel may be a UL data channel (also referred to as an sPUSCH, a PUSCH, and so on), and/or a UL control channel (also referred to as an sPUCCH, a PUCCH, and so on). In parts of the following description where generation of a predetermined sequence is not specifically mentioned, methods (for example, formulas and so on) of generating a base sequence (or a DMRS sequence) in the existing LTE systems may be applied.

(First Aspect)

Regarding a predetermined sequence to be applied to a PUCCH and/or a DMRS, the first aspect describes a configuration of supporting hopping based on symbol level and/or PRB level, as well as hopping at slot level (for example, SCG).

A UE determines an index of a predetermined sequence, by using at least one of a symbol index and a frequency resource index. Specifically, the index of a predetermined sequence may be determined by using a formula including a symbol index and/or a frequency resource index. The index of a predetermined sequence can be determined based on a group number and a base sequence number (for example, a formula including a group number and a base sequence number).

For example, the group number (u) may be defined by a formula including a symbol index and/or a frequency resource index (see Formula (1)).

$$u=(f_{gh}^{slot}(n_s)+f_{gh}^{PRB}(k)+f_{gh}^{symbol}(l)+f_{ss}) \bmod 30 \qquad \text{Formula (1)}$$

Formula (1) is a formula that is used to determine a group number (u) corresponding to slot #$n_s$, a lowest frequency resource index (lowest PRB and/or RE index) #k to which a PUCCH and/or a PUSCH is mapped, and symbol #1. Here, the group number (u) is defined by using group hopping patterns $f_{gh}^{slot}(n_s)$, $f_{gh}^{PRB}(k)$, and $f_{gh}^{symbol}(l)$, and a sequence shift pattern ($f_{ss}$). Note that a slot index may be a slot index (vertical slot index) that is initialized ($n_s$=0) every predetermined period (for example, 10 ms).

The group hopping pattern $f_{gh}^{slot}(n_s)$ includes a slot index, the group hopping pattern $f_{gh}^{PRB}(k)$ includes a frequency resource (PRB and/or RE) index, and the group hopping pattern $f_{gh}^{symbol}(l)$ includes a symbol index. Note that a formula of the group number of the predetermined sequence is not limited to Formula (1) above. A formula may not include a part of parameters of the group hopping patterns (for example, one of $f_{gh}^{PRB}(k)$ and $f_{gh}^{symbol}(i)$). Alternatively, a formula may include another parameter.

In this manner, the group number (u) can be determined based on a hopping pattern and a sequence shift pattern. The hopping pattern and/or the sequence shift pattern may be based on a physical cell ID (cell ID) or a virtual cell ID. A UE may be informed of a physical cell ID by means of a sequence number of a synchronization signal (PSS/SSS), and may be informed of a virtual cell ID by means of RRC signaling.

By determining the group number (u) (i.e., determining the index of a predetermined sequence) in consideration of a PRB and/or a symbol to which a PUCCH or a DMRS is mapped as in the manner described above, the predetermined sequences can be randomized among PRBs and/or among symbols. As a result, even when a PUCCH or a DMRS is mapped per PRB and/or per symbol, inter-cell interference can be reduced.

Enabling and disabling of a part or all of the group hopping patterns $f_{gh}^{slot}(n_s)$, $f_{gh}^{PRB}(k)$, and $f_{gh}^{symbol}(l)$ may be configured based on a notification from a base station. As the notification from a base station, for example, higher layer signaling (for example, cell-specific RRC signaling (RRC parameters), a broadcast signal, and/or the like) can be used.

The following describes a case (Configuration Example 1) where whether all of the group hopping patterns $f_{gh}^{slot}(n_s)$, $f_{gh}^{PRB}(k)$, and $f_{gh}^{symbol}(l)$ are applied or not is controlled based on a notification from a base station, and cases (Configuration Examples 2 and 3) where whether a part of the group hopping patterns is applied or not is controlled based on a notification from a base station.

Configuration Example 1

Configuration Example 1 illustrates a case where enabling and disabling of each of the group hopping patterns $f_{gh}^{slot}(n_s)$, $f_{gh}^{PRB}(k)$, and $f_{gh}^{symbol}(l)$ is controlled based on a notification from a base station. A UE controls whether the hopping patterns at slot level, symbol level, and PRB level are applied or not, based on cell-specific RRC parameters (see Formula (2)).

$$f_{gh}^{slot}(n_s) = \begin{cases} 0 & \text{if group hopping is disabled} \\ \left(\sum_{i=0}^{Z^{slot}-1} c(Z^{slot}*n_s+i)\cdot 2^i\right) \bmod 30 & \text{if group hopping is enabled} \end{cases}$$

$$f_{gh}^{PRB}(k) = \begin{cases} 0 & \text{if group hopping is disabled} \\ \left(\sum_{i=0}^{Z^{PRB}-1} c'(Z^{PRB}*k+i)\cdot 2^i\right) \bmod 30 & \text{if group hopping is enabled} \end{cases}$$

$$f_{gh}^{symbol}(l) = \begin{cases} 0 & \text{if group hopping is disabled} \\ \left(\sum_{i=0}^{Z^{symbol}-1} c''(Z^{symbol}*l+i)\cdot 2^i\right) \bmod 30 & \text{if group hopping is enabled} \end{cases}$$

Formula (2)

Here, $Z^{slot}$, $Z^{PRB}$, and $Z^{symbol}$ may be values defined in advance in a specification (for example, the number of scrambling code), or may be values notified to a UE from a base station. As an example, $Z^{slot}$ may be 8 ($Z^{slot}=8$), $Z^{PRB}$ may be 10 ($Z^{PRB}=10$), and $Z^{symbol}$ may be 12 ($Z^{symbol}=12$). As a matter of course, the values of $Z^{slot}$, $Z^{PRB}$, and $Z^{symbol}$ are not limited to the above values.

c (i), c' (i), and c" (i) are pseudo-random sequences, and are defined in advance in a specification, using predetermined parameters. Note that, here, configurations (values) of c (i), c' (i), and c" (i) to be applied to respective group hopping patterns may be common configurations, or may be different configurations.

Generation of the pseudo-random sequences is initialized with $c_{init}$. For example, $c_{init}$ is defined by Formula (3) below, and generation of the pseudo-random sequences is initialized (or reset) every predetermined period (for example, 10 ms), by using $c_{init}$. In this case, the slot index ($n_s$) may also be initialized ($n_s=0$) at the same timing. Note that configurations of $c_{init}$ to be applied to respective group hopping patterns may be common configurations, or may be different configurations. For example, different c (i) may be applied to each of the group hopping patterns, and the same $c_{init}$ may be used for initialization (reset).

$$c_{init} = \left\lfloor \frac{N_{ID}^{cell}}{30} \right\rfloor$$

Formula (3)

In Formula (3), $N_{ID}^{cell}$ is a configurable ID, and a virtual cell ID or a cell ID can be used, for example. Note that the sequence shift pattern ($f_{ss}$) may be determined based on $N_{ID}^{cell}$. For example, in the predetermined sequence of a PUCCH, the sequence shift pattern may be determined based on a predetermined formula (for example, $f_{ss}^{PUCCH}=N_{ID}^{cell} \bmod 30$). In the group number, $c_{init}+1$ hopping patterns and 30 sequence shift patterns may be used.

In Formula (2), if each of the group hopping patterns $f_{gh}^{slot}(n_s)$, $f_{gh}^{PRB}(k)$, and $f_{gh}^{symbol}(l)$ is disabled, the values of the hopping patterns are 0. On the other hand, if each of the group hopping patterns $f_{gh}^{slot}(n_s)$, $f_{gh}^{PRB}(k)$, and $f_{gh}^{symbol}(l)$ is enabled, predetermined values are configured. In this case, an index of the group number (predetermined sequence) is determined based on the values of the group hopping patterns configured to be enabled.

FIG. 2A shows an example of group numbers (u) corresponding to respective radio resources when none of the group hopping patterns $f_{gh}^{slot}(n)$, $f_{gh}^{PRB}(k)$, and $f_{gh}^{symbol}(l)$ is applied ($f_{gh}^{slot}(n_s)$, $f_{gh}^{PRB}(k)$, and $f_{gh}^{symbol}(l)$ are disabled). Here, the same group number (here, 9) is applied to each PRB in each symbol in each slot. In this case, the group numbers among slots, among PRBs, and among symbols are the same, and thus interference with neighboring cells is more likely to occur.

FIG. 2B shows an example of group numbers (u) corresponding to respective radio resources when all of the group hopping patterns $f_{gh}^{slot}(n_s)$, $f_{gh}^{PRB}(k)$, and $f_{gh}^{symbol}(l)$ are applied ($f_{gh}^{slot}(n_s)$, $f_{gh}^{PRB}(k)$, and $f_{gh}^{symbol}(l)$ are enabled). In this case, the group numbers are randomized among slots, among PRBs, and among symbols. Thus, the probability of generation of interference with neighboring cells can be effectively reduced.

Note that, for a UE, configuration (enabling or disabling) of the plurality of group hopping patterns $f_{gh}^{slot}(n_s)$, $f_{gh}^{PRB}(k)$, and $f_{gh}^{symbol}(l)$ may be performed at the same time, or may be configured separately (independently). When the configuration is performed at the same time, for example, a base station collectively configures enabling or disabling of the plurality of group hopping patterns $f_{gh}^{slot}(n_s)$, $f_{gh}^{PRB}(k)$, and $f_{gh}^{symbol}(l)$ for a UE, by using one bit. In this case, the number of bits necessary for notification can be prevented from increasing.

Alternatively, a base station may separately configure enabling or disabling of the plurality of group hopping patterns $f_{gh}^{slot}(n_s)$, $f_{gh}^{PRB}(k)$, and $f_{gh}^{symbol}(l)$ for a UE, by using different bit fields of RRC signaling (or different RRC signaling). In this case, whether each of the group hopping patterns $f_{gh}^{slot}(n_s)$, $f_{gh}^{PRB}(k)$, and $f_{gh}^{symbol}(l)$ is configured or not can be flexibly controlled.

Note that a combination of predetermined group hopping patterns (for example, $f_{gh}^{slot}(n_s)$ and $f_{gh}^{symbol}(l)$) may be configured at the same time, and another group hopping pattern (for example, $f_{gh}^{PRB}(k)$) may be independently configured. The combination of predetermined group hopping patterns is not limited to that of $f_{gh}^{slot}(n_s)$ and $f_{gh}^{symbol}(l)$, and may be a combination of $f_{gh}^{symbol}(l)$ and $f_{gh}^{PRB}(k)$, or a combination of $f_{gh}^{slot}(n_s)$ and $f_{gh}^{PRB}(k)$.

Configuration Example 2

In Configuration Example 2, enabling and disabling of predetermined group hopping patterns (for example, hopping at time resource level $f_{gh}^{slot}(n_s)$ and $f_{gh}^{symbol}(l)$) is controlled based on a notification from a base station. In contrast, a hopping pattern at frequency resource level (for example, hopping at PRB level $f_{gh}^{PRB}(k)$) is controlled to be applied (or enabled), irrespective of a notification from a base station (see Formula (4)).

$$f_{gh}^{slot}(n_s) = \begin{cases} 0 & \text{if group hopping is disabled} \\ \left(\sum_{i=0}^{Z^{slot}-1} c(Z^{slot} * n_s + i) \cdot 2^i\right) \bmod 30 & \text{if group hopping is enabled} \end{cases}$$

$$f_{gh}^{PRB}(k) = \left(\sum_{i=0}^{Z^{PRB}-1} c'(Z^{PRB} * k + i) \cdot 2^i\right) \bmod 30$$

$$f_{gh}^{symbol}(l) = \begin{cases} 0 & \text{if group hopping is disabled} \\ \left(\sum_{i=0}^{Z^{symbol}-1} c''(Z^{symbol} * l + i) \cdot 2^i\right) \bmod 30 & \text{if group hopping is enabled} \end{cases}$$

Formula (4)

In Formula (4), if the group hopping patterns $f_{gh}^{slot}(n_s)$ and $f_{gh}^{symbol}(l)$ are disabled, the values are 0. On the other hand, if the group hopping patterns $f_{gh}^{slot}(n_s)$ and $f_{gh}^{symbol}(l)$ are enabled, predetermined values are configured. For the group hopping pattern $f_{gh}^{PRB}(k)$, a predetermined value is configured irrespective of a notification from a base station. In other words, a UE determines an index of the group number (i.e., predetermined sequence), based on a group hopping pattern configured to be enabled out of the group hopping patterns at slot level and symbol level $f_{gh}^{slot}(n_s)$ and $f_{gh}^{symbol}(l)$, and on a group hopping pattern at PRB level $f_{gh}^{PRB}(k)$.

Figures 3A, 3B:
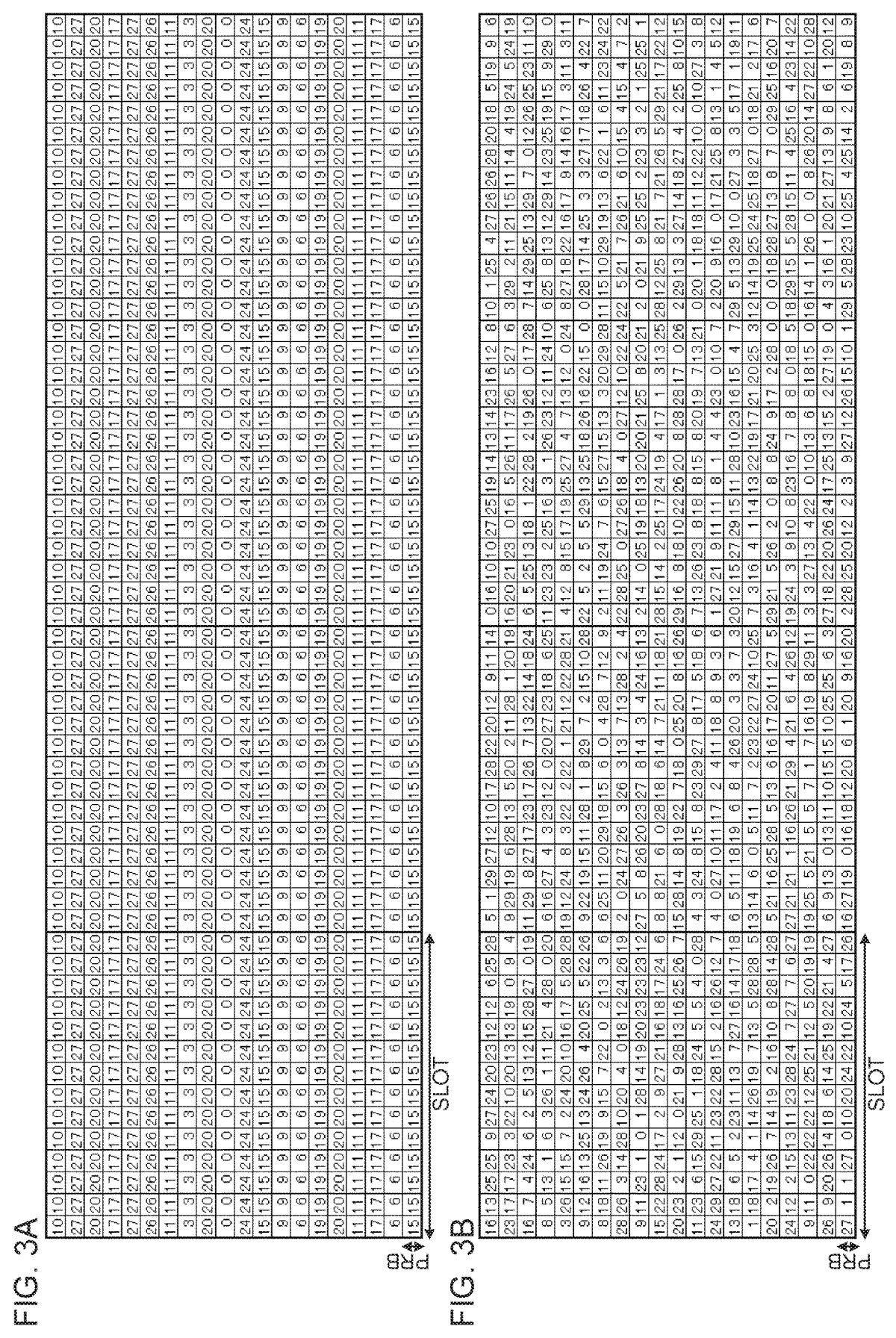

FIG. 3A shows an example of group numbers (u) corresponding to respective radio resources when the group hopping patterns at slot level and symbol level $f_{gh}^{slot}(n_s)$ and $f_{gh}^{symbol}(l)$ are not applied ($f_{gh}^{slot}(n_s)$ and $f_{gh}^{symbol}(l)$ are disabled). In this case, the group hopping pattern at PRB level $f_{gh}^{PRB}(k)$ is applied, and thus the group numbers (u) are randomized among PRBs. On the other hand, the same group number is configured among slots and among symbols.

FIG. 3B shows an example of group numbers (u) corresponding to respective radio resources when the group hopping patterns at slot level and symbol level $f_{gh}^{slot}(n_s)$ and $f_{gh}^{symbol}(l)$ are applied ($f_{gh}^{slot}(n_s)$ and $f_{gh}^{symbol}(l)$ are enabled). In this case, the group numbers are randomized among slots, among PRBs, and among symbols. Thus, occurrence of interference with neighboring cells can be effectively reduced.

By applying the group hopping pattern at PRB level $f_{gh}^{PRB}(k)$ irrespective of a notification from a base station as in the manner described above, randomization of the predetermined sequences can be implemented at least among PRBs. As a result, even when the group hopping pattern(s) at slot level and/or symbol level $f_{gh}^{slot}(n_s)$ and/or $f_{gh}^{symbol}(l)$ is not applied, inter-cell interference can be reduced in a certain degree.

Note that, for a UE, configuration (enabling or disabling) of the plurality of group hopping patterns $f_{gh}^{slot}(n_s)$ and $f_{gh}^{symbol}(l)$ may be performed at the same time, or may be configured separately (independently). If the configuration is performed at the same time, for example, a base station collectively configures enabling or disabling of the plurality of group hopping patterns $f_{gh}^{slot}(n_s)$ and $f_{gh}^{symbol}(l)$ for a UE, by using one bit. In this case, the number of bits necessary for notification can be prevented from increasing.

Alternatively, a base station may separately configure enabling or disabling of the plurality of group hopping patterns $f_{gh}^{slot}(n_s)$ and $f_{gh}^{symbol}(l)$ for a UE, by using different bit fields of RRC signaling (or different RRC signaling). In this case, whether each of the group hopping patterns $f_{gh}^{slot}(n_s)$ and $f_{gh}^{symbol}(l)$ is configured or not can be flexibly controlled.

Note that Configuration Example 2 illustrates a case where the group hopping pattern at PRB level $f_{gh}^{PRB}(k)$ is applied irrespective of a notification from a base station, but this is not restrictive. For example, the group hopping pattern at symbol level $f_{gh}^{symbol}(l)$ may be applied irrespective of a notification from a base station, and whether the group hopping patterns at slot level and PRB level $fg^{slot}(n_s)$ and $f_{gh}^{PRB}(k)$ are applied or not may be controlled according to a notification from a base station. Alternatively, the group hopping pattern at slot level $f_{gh}^{slot}(n_s)$ may be applied irrespective of a notification from a base station, and whether the group hopping patterns at symbol level and PRB level $f_{gh}^{symbol}(l)$ and $f_{gh}^{PRB}(k)$ are applied or not may be controlled according to a notification from a base station.

Alternatively, the group hopping pattern at symbol level $f_{gh}^{symbol}(l)$ may not be applied irrespective of a notification from a base station, and whether the group hopping patterns at slot level and PRB level $f_{gh}^{slot}(n_s)$ and $f_{gh}^{PRB}(k)$ are applied or not may be controlled according to a notification from a base station. As a result, the same base sequence can be applied in different symbols within the same slot. Therefore, when a PUCCH or a PUSCH of a plurality of symbols is used, multiplexing capacity of the PUCCH or the PUSCH can be increased by applying time-domain OCC among the symbols.

Configuration Example 3

In Configuration Example 3, enabling and disabling of a predetermined group hopping pattern (for example, hopping at slot level $f_{gh}^{slot}(n_s)$) is controlled based on a notification from a base station. In contrast, other group hopping patterns (for example, hopping at symbol level $f_{gh}^{symbol}(l)$ and hopping at PRB level $f_{gh}^{PRB}(k)$) are controlled to be applied (or enabled) irrespective of a notification from a base station (see Formula (5)).

$$f_{gh}^{slot}(n_s) = \begin{cases} 0 & \text{if group hopping is disabled} \\ \left(\sum_{i=0}^{Z^{slot}-1} c(Z^{slot} * n_s + i) \cdot 2^i\right) \bmod 30 & \text{if group hopping is enabled} \end{cases}$$

Formula (5)

-continued $$f_{gh}^{PRB}(k) = \left(\sum_{i=0}^{Z^{PRB}-1} c'(Z^{PRB} * k + i) \cdot 2^i\right) \bmod 30$$

$$f_{gh}^{symbol}(l) = \left(\sum_{i=0}^{Z^{symbol}-1} c''(Z^{symbol} * l + i) \cdot 2^i\right) \bmod 30$$

In Formula (5), if the group hopping pattern at slot level $f_{gh}^{slot}(n_s)$ is disabled, the value is 0. On the other hand, if the group hopping patterns $f_{gh}^{slot}(n_s)$ and $f_{gh}^{symbol}(l)$ are enabled, predetermined values are configured. For the group hopping patterns at symbol level and PRB level $f_{gh}^{symbol}(l)$ and $f_{gh}^{PRB}(k)$, predetermined values are configured irrespective of a notification from a base station. In other words, a UE determines an index of the group number (predetermined sequence), based on at least the group hopping pattern at symbol level $f_{gh}^{symbol}(l)$ and the group hopping pattern at PRB level $f_{gh}^{PRB}(k)$.

Figures 4A, 4B:
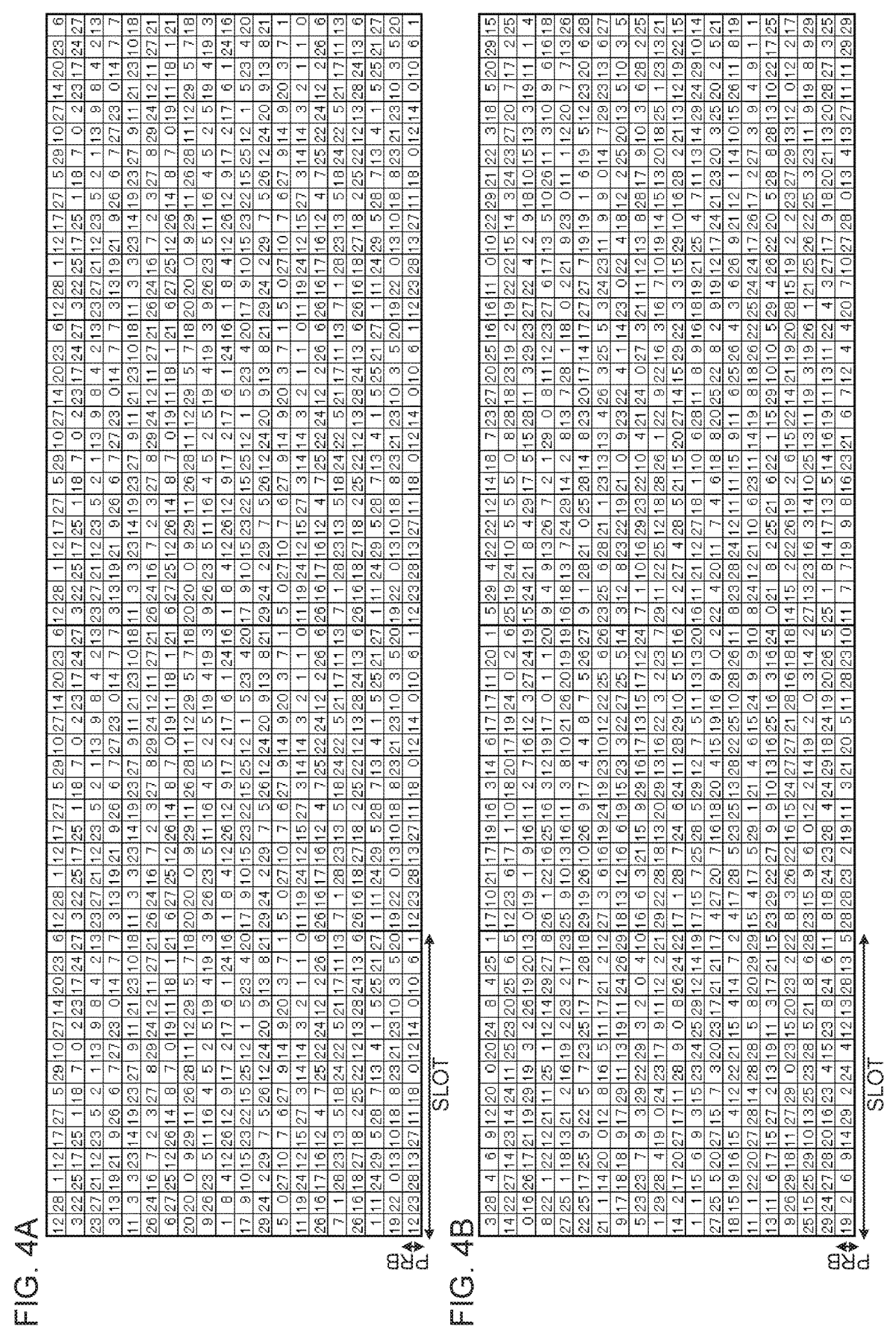

FIG. 4A shows an example of group numbers (u) corresponding to respective radio resources when the group hopping pattern at slot level $f_{gh}^{slot}(n_s)$ is not applied ($f_{gh}^{slot}(n_s)$ is disabled). In this case, the group hopping pattern at symbol level $f_{gh}^{symbol}(l)$ and the group hopping pattern at PRB level $f_{gh}^{PRB}(k)$ are applied, and thus the group numbers (u) are randomized among symbols and among PRBs. On the other hand, the same group number is applied among slots.

FIG. 4B shows an example of group numbers (u) corresponding to respective radio resources when the group hopping pattern at slot level $f_{gh}^{slot}(n_s)$ is applied ($f_{gh}^{slot}(n_s)$ is enabled). In this case, the group numbers are randomized among slots, among PRBs, and among symbols. Thus, occurrence of interference with neighboring cells can be effectively reduced.

By applying the group hopping patterns at symbol level and PRB level $f_{gh}^{symbol}(l)$ and $f_{gh}^{PRB}(k)$ irrespective of a notification from a base station as in the manner described above, randomization of the predetermined sequences can be implemented at least among symbols and among PRBs. As a result, even when the group hopping pattern at slot level $f_{gh}^{slot}(n_s)$ is disabled, inter-cell interference can be reduced in a certain degree.

Note that Configuration Example 3 illustrates a case where the group hopping pattern at symbol level $f_{gh}^{symbol}(l)$ and the group hopping pattern at PRB level $f_{gh}^{PRB}(k)$ are applied irrespective of a notification from a base station, but this is not restrictive. For example, the group hopping pattern at slot level $f_{gh}^{slot}(n_s)$ and the group hopping pattern at PRB level $f_{gh}^{PRB}(k)$ may be applied irrespective of a notification from a base station, and whether the group hopping pattern at symbol level $f_{gh}^{symbol}(l)$ is applied or not may be controlled according to a notification from a base station. Alternatively, the group hopping pattern at slot level $f_{gh}^{slot}(n_s)$ and the group hopping pattern at symbol level $f_{gh}^{symbol}(l)$ may be applied irrespective of a notification from a base station, and whether the group hopping pattern at PRB level $f_{gh}^{PRB}(k)$ is applied or not may be controlled according to a notification from a base station.

Alternatively, the group hopping pattern at symbol level $f_{gh}^{symbol}(l)$ may not be applied irrespective of a notification from a base station, and whether the group hopping pattern at PRB level $f_{gh}^{PRB}(k)$ is applied or not may be controlled according to a notification from a base station. As a result, the same base sequence can be applied in different symbols within the same slot. Therefore, when a PUCCH or a PUSCH of a plurality of symbols is used, multiplexing capacity of the PUCCH or the PUSCH can be increased by applying time-domain OCC among the symbols.

<Variations>

The above describes a configuration (for example, Formula (1)) in which the plurality of group hopping patterns $f_{gh}^{slot}(n_s)$, $f_{gh}^{PRB}(k)$, and $f_{gh}^{symbol}(l)$ are individually included in the group number (u), but this is not restrictive. For example, the group number (u) may be defined by using a group hopping pattern $f_{gh}(n_s)$ and a sequence shift pattern ($f_{ss}$) (see Formula (6)).

$$u = (f_{gh}(n_s) + f_{ss}) \bmod 30 \qquad \text{Formula (6)}$$

$f_{gh}(n_s)$ includes at least one or more of the slot index ($n_s$), the symbol index (l), and the frequency resource (PRB and/or RE) index (k). The configuration of the group hopping pattern $f_{gh}(n_s)$ will be described below, by using examples.

Configuration Example 1 of $f_{gh}(n_s)$

In Configuration Example 1, whether the hopping pattern at slot level, the hopping pattern at symbol level, and the hopping pattern at frequency resource level are applied or not is controlled based on a notification from a base station. For example, if the group hopping pattern $f_{gh}(n_s)$ is disabled based on a notification from a base station, the value is 0. If the group hopping pattern $f_{gh}(n_s)$ is enabled based on a notification from a base station, the value is set to a predetermined value (see Formula (7)).

$$f_{gh}(n_s) = \begin{cases} 0 & \text{if group hopping is disabled} \\ \left(\sum_{i=0}^{Z^{cell}-1} c(Z^{cell} \cdot N^{RB} \cdot N_{symb}^{UL} \cdot n_s + Z^{cell} \cdot \\ N^{RB} \cdot l + Z^{cell} \cdot k + i) \cdot 2^i\right) \bmod 30 & \text{if group hopping is enabled} \end{cases}$$

Formula (7)

Here, $Z^{cell}$ may be a value defined in advance in a specification (for example, the number of scrambling code), or may be a value notified to a UE from a base station. As an example, $Z^{cell}$ may be 20 ($Z^{cell}=20$). As a matter of course, the value of $Z^{cell}$ is not limited to the above value. $Z^{cell}$ may be a different value for each group hopping or may be a common value for group hopping.

$N^{RB}$ corresponds to the number of PRBs and/or REs of a predetermined bandwidth (for example, a cell bandwidth, or a bandwidth configured for a UE), and $N_{symb}^{UL}$ corresponds to the number of symbols included in one slot, or the number of uplink symbols included in one slot. Other parameters (c(i) and the like) may have similar configurations as in Formula (1).

The predetermined value in the case of enabling is determined based on the slot index ($n_s$), the symbol index (l), and the frequency resource index (k). In this case, the group numbers are randomized among slots, among PRBs, and among symbols. Thus, the probability of generation of interference with neighboring cells can be effectively reduced.

Configuration Example 2 of $f_{gh}(n_s)$

In Configuration Example 2, whether the hopping pattern at slot level and the hopping pattern at symbol level are applied or not is controlled based on a notification from a base station. For example, if the group hopping pattern $f_{gh}(n_s)$ is disabled based on a notification from a base station, the value of $f_{gh}(n_s)$ is determined based on the frequency resource (PRB and/or RE) index (k) (see Formula (8)).

On the other hand, if the group hopping pattern $f_{gh}(n_s)$ is enabled based on a notification from a base station, the value of $f_{gh}(n_s)$ is determined based on the slot index ($n_s$), the symbol index (l), and the frequency resource index (k). Note that the case of disabling may be expressed by a first configuration value (bit value), and the case of enabling may be expressed by a second configuration value (bit value).

the same base sequence can be applied in different symbols within the same slot. Therefore, when a PUCCH or a PUSCH of a plurality of symbols is used, multiplexing capacity of the PUCCH or the PUSCH can be increased by applying time-domain OCC among the symbols.

Configuration Example 3 of $f_{gh}(n_s)$

In Configuration Example 3, whether the hopping pattern at slot level is applied or not is controlled based on a notification from a base station. For example, if the group hopping pattern $f_{igh}(n_s)$ is disabled based on a notification from a base station, the value of $f_{gh}(n_s)$ is determined based on the frequency resource index (k) and the symbol index (l) (see Formula (9)).

On the other hand, if the group hopping pattern $f_{gh}(n_s)$ is enabled based on a notification from a base station, the value of $f_{gh}(n_s)$ is determined based on the slot index ($n_s$), the symbol index (l), and the frequency resource index (k). Note that the case of disabling may be expressed by a first configuration value (bit value), and the case of enabling may be expressed by a second configuration value (bit value).

$$f_{gh}(n_s) = \begin{cases} \left(\sum_{i=0}^{Z^{cell}-1} c(Z^{cell} * k + i) \cdot 2^i\right) \bmod 30 & \text{if group hopping is disabled} \\ \left(\sum_{i=0}^{Z^{cell}-1} c(Z^{cell} \cdot N^{RB} \cdot N^{UL}_{symb} \cdot n_s + Z^{cell} \cdot N^{RB} \cdot l + Z^{cell} \cdot k + i) \cdot 2^i\right) \bmod 30 & \text{if group hopping is enabled} \end{cases} \quad \text{Formula (8)}$$

In this case, the group number can be determined by using the frequency resource index (by applying the hopping pattern at frequency resource level), irrespective of a notification from a base station. As a result, even when the group hopping at slot level and/or symbol level is not applied, inter-cell interference can be reduced in a certain degree.

Note that Configuration Example 2 illustrates a case where the group hopping at frequency resource level is applied irrespective of a notification from a base station, but this is not restrictive. For example, in Formula (8), the frequency resource index and the symbol index may be interchanged, or the frequency resource index and the slot index may be interchanged.

The group hopping at symbol level may not be applied irrespective of a notification from a base station. As a result, $$f_{gh}(n_s) = \begin{cases} \left(\sum_{i=0}^{Z^{cell}-1} c(Z^{cell} \cdot N^{RB} \cdot l + Z^{cell} \cdot k + i) \cdot 2^i\right) \bmod 30 & \text{if group hopping is disabled} \\ \left(\sum_{i=0}^{Z^{cell}-1} c(Z^{cell} \cdot N^{RB} \cdot N^{UL}_{symb} \cdot n_s + Z^{cell} \cdot N^{RB} \cdot l + Z^{cell} \cdot k + i) \cdot 2^i\right) \bmod 30 & \text{if group hopping is enabled} \end{cases} \quad \text{Formula (9)}$$

In this case, the group number can be determined by using the symbol index and the frequency resource index (by applying the hopping pattern at symbol level and the hopping pattern at frequency resource level), irrespective of a notification from a base station. As a result, even when the group hopping at slot level is not applied, inter-cell interference can be reduced in a certain degree.

Note that Configuration Example 3 illustrates a case where the group hopping at symbol level and frequency resource level is applied irrespective of a notification from a base station, but this is not restrictive. For example, in Formula (8), the slot index and the frequency resource index may be interchanged, or the slot index and the symbol index may be interchanged.

The group hopping at symbol level may not be applied irrespective of a notification from a base station. As a result, the same base sequence can be applied in different symbols within the same slot. Therefore, when a PUCCH or a PUSCH of a plurality of symbols is used, multiplexing capacity of the PUCCH or the PUSCH can be increased by applying time-domain OCC among the symbols.

(Second Aspect)

Regarding cyclic shift (CS) to be applied to a predetermined sequence of a PUCCH and/or a DMRS, the second aspect describes a configuration of applying at least a symbol index (CS hopping at symbol level) and/or a frequency resource index (CS hopping at frequency resource level).

A UE determines cyclic shift (CS) to be applied to a predetermined sequence, by using at least one of a symbol index and a frequency resource index. For example, the CS index is determined based on hopping at slot level and symbol level (slot index and symbol index). Alternatively, the CS index may be determined based on hopping at frequency resource (PRB and/or RE) level (frequency resource index), as well as hopping at slot level and symbol level.

The following describes a case (CS Hopping Configuration 1) where CS hopping at slot and symbol levels is performed, and a case (CS Hopping Configuration 2) where CS hopping at slot, symbol, and PRB levels is performed, by using examples. Note that CS in the second aspect can be applied to a predetermined PUCCH format. For example, for at least one of PUCCH formats 0, 1, 3, and 4, cyclic shift described below is applied as cyclic shift of a base sequence in each symbol. Note that PUCCH formats 3 and 4, CS may apply to at least a DMRS symbol.

<CS Hopping Configuration 1>

In CS Hopping Configuration 1, hopping of the CS indexes is performed at slot level and symbol level. For example, a UE determines a CS index ($\alpha(n_s, 1)$) to be applied to a predetermined sequence, by using Formula (10) below. Note that Formula (10) is used to determine a CS index corresponding to slot #$n_s$ and symbol #1.

$$n_{cs}^{cell}(n,l) = \Sigma_{i=0}^{Z^{cell}-1} c(Z^{cell} \cdot N_{symb}^{UL} \cdot n_s + Z^{cell} \cdot l + i) \cdot 2^i$$

$$n_{cs}(n_s,l) = [n_{ss}^{cell}(n_s,l) + n'(n_s)] \bmod N_{sc}^{RB}$$

$$\alpha(n_s,l) = 2\pi \cdot n_{cs}(n_s,l)/N_{sc}^{RB} \qquad \text{Formula (10)}$$

Here, $n_{cs}^{cell}(n_s, 1)$ corresponds to a CS hopping pattern shared in a cell (for example, shared in a predetermined UE group). $Z^{cell}$ may be a value defined in advance in a specification (for example, the number of scrambling code), or may be a value notified to a UE from a base station. As an example, $Z^{cell}$ may be 20 ($Z^{cell}=20$). As a matter of course, the value of $Z^{cell}$ is not limited to the above value. $Z^{cell}$ may be a different value for each group hopping or may be a common value for group hopping.

$n'(n_s)$ corresponds to a value configured in advance (for example, initial value of cyclic shift). For example, $n'(n_s)$ may be a value explicitly notified based on a PUCCH resource set configured by a combination of RRC and DCI, a value determined based on a control channel element (CCE) index of a downlink control channel (PDCCH), or a value determined based on a PRB and/or RE index of a downlink shared channel (PDSCH).

$N_{SC}^{RB}$ corresponds to the number of subcarriers (or REs) in each PRB, and for example, $N_{SC}^{RB}$ is 12 ($N_{SC}^{RB}=12$). $N_{symb}^{UL}$ corresponds to a UL period (the number of UL symbols) or the number of slots.

c (i) is a pseudo-random sequence, and is defined in advance in a specification, using a predetermined parameter. Generation of the pseudo-random sequences is initialized with $c_{init}$. For example, $c_{init}$ can be determined based on a configurable ID ($N_{ID}^{cell}$). As $N_{ID}^{cell}$, a virtual cell ID or a cell ID can be used, and $c_{init}$ may be equal to $N_{ID}^{cell}$ ($c_{init}=N_{ID}^{cell}$). c (i) may be initialized (or reset) every predetermined period (for example, 10 ms), by using $c_{init}$.

A CS index (for example, $\alpha(n_s, 1)$) actually used by a UE can be determined by the CS index ($n'(n_s)$) configured based on a predetermined method, and the CS hopping pattern ($n_{cs}^{cell}(n_s, 1)$) shared in a cell.

In CS Hopping Configuration 1, Formula (10) includes the slot index ($n_s$) and the symbol index (l). Therefore, the CS indexes are hopped at slot level and symbol level.

Figure 5:
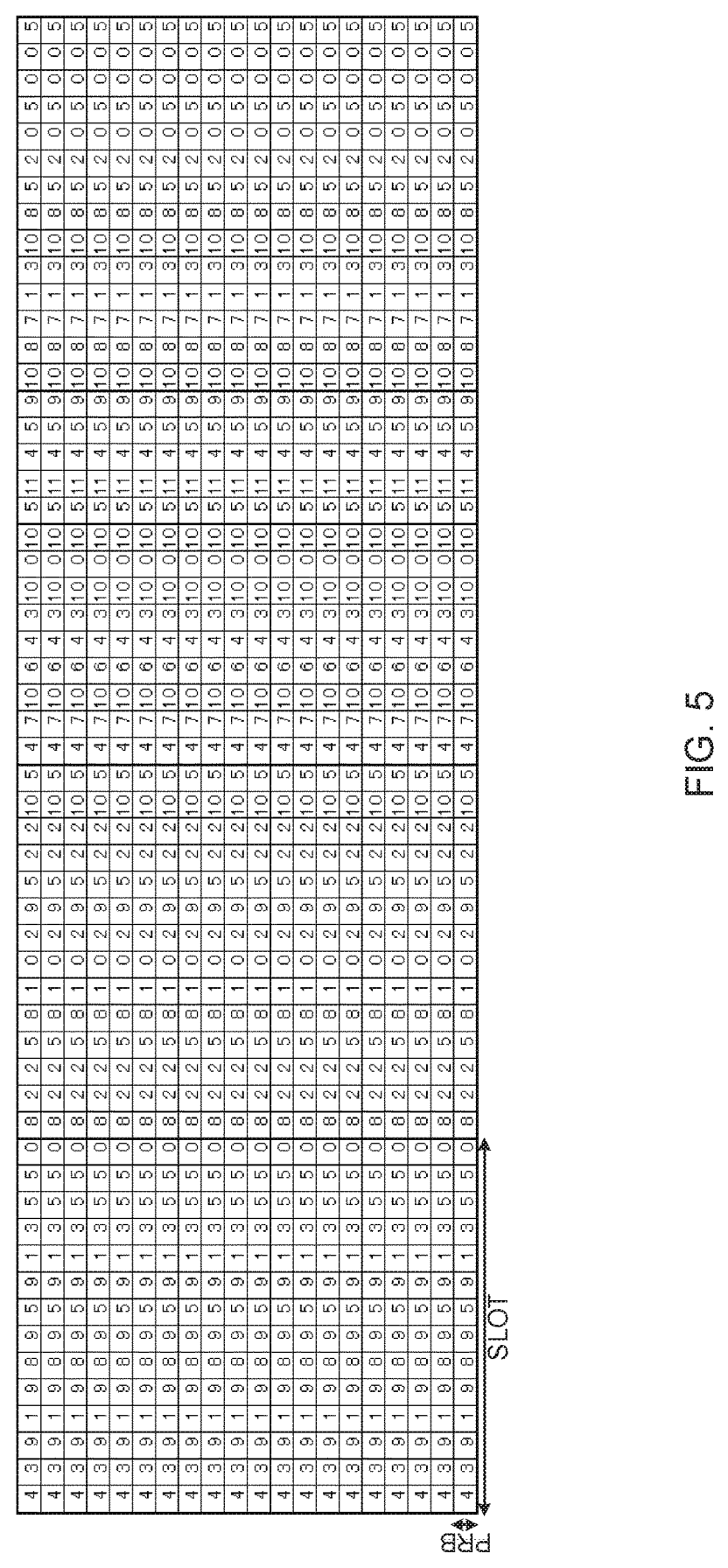

FIG. 5 shows an example of CS indexes corresponding to respective radio resources when hopping of the CS indexes is performed at slot level and symbol level. In this case, the CS indexes are randomized among slots and among symbols. Thus, occurrence of interference with neighboring cells can be effectively reduced.

<CS Hopping Configuration 2>

In CS Hopping Configuration 2, hopping of the CS indexes is performed at slot level, symbol level, and frequency resource (PRB and/or RE) level. For example, a UE determines a CS index ($\alpha(n_s, 1, k)$) to be applied to a predetermined sequence, by using Formula (11) below. Note that Formula (11) is used to determine a CS index corresponding to slot #$n_s$, symbol #1, and a minimum frequency resource index (lowest PRB and/or RE index) #k to which a PUCCH and/or a PUSCH is mapped.

$$n_{cs}^{cell}(n_s,l,k) = \Sigma_{i=0}^{Z^{cell}-1} c(Z^{cell} \cdot N^{RB} \cdot N_{symb}^{UL} \cdot n_s + Z^{cell} \cdot N^{cell} \cdot N^{RB} \cdot l + Z^{cell} \cdot k + i) \cdot 2^i$$

$$n_{cs}(n_s,l,k) = [n_{ss}^{cell}(n_s,l,k) + n'(n_s)] \bmod N_{sc}^{RB}$$

$$\alpha(n_s,l,k) = 2\pi \cdot n_{cs}(n_s,l,k)/N_{sc}^{RB} \qquad \text{Formula (11)}$$

Here, $N^{RB}$ corresponds to the number of PRBs and/or REs of a predetermined bandwidth (for example, a cell bandwidth, or a bandwidth configured for a UE). Other parameters ($Z^{cell}$ and the like) are similar to those in Formula (10).

k corresponding to a frequency resource index (for example, PRB index) is added to Formula (11), in comparison with Formula (10). In other words, in CS Hopping Configuration 2, Formula (11) includes the slot index ($n_s$), the symbol index (l), and the frequency resource index (k). Therefore, the CS indexes are hopped at slot level, symbol level, and frequency resource level.

Figure 6:
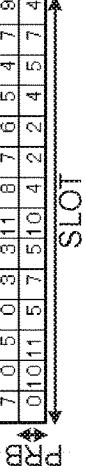
FIG. 6 is a diagram to show another example of CS indexes corresponding to respective radio resources.

FIG. 6 shows an example of CS indexes corresponding to respective radio resources when hopping of the CS indexes is performed at slot level, symbol level, and frequency resource level. In this case, the CS indexes are randomized among slots, among symbols, and among PRBs. Thus, occurrence of interference with neighboring cells can be effectively reduced.

<Variations>

As is the case with sequence hopping (group hopping) illustrated in the first aspect, whether CS hopping is applied or not (enabled or disabled) can also be configured based on a notification from a base station.

A base station may configure configuration (enabling or disabling) of sequence hopping and configuration of CS hopping for a UE at the same time, or separately (independently). For example, a base station collectively configures enabling or disabling of sequence hopping and CS hopping for a UE, by using higher layer signaling. In this case, the number of bits necessary for notification can be prevented from increasing.

Alternatively, a base station may separately configure enabling or disabling of sequence hopping and CS hopping for a UE, by using different bit fields of higher layer signaling (or different higher layer signaling). In this case, whether sequence hopping and CS hopping are configured or not can be flexibly controlled.

<PUCCH Format>

Note that, when the present embodiment is applied to a PUCCH, the present embodiment can be applied to a predetermined PUCCH format. An example of PUCCH formats will be described below with reference to FIG. 7. Note that PUCCH formats to which the present embodiment can be applied are not limited to the configuration described below.

FIG. 7 shows a plurality of PUCCH formats having various numbers of symbols and/or numbers of bits of UCI. Note that the PUCCH formats shown in FIG. 7 are merely examples, and the contents of PUCCH formats 0 to 4 are not limited to those shown in FIG. 7.

For example, in FIG. 7, PUCCH format 0 is a short PUCCH for UCI including up to 2 bits, and is also referred to as a sequence-based short PUCCH and so on. The short PUCCH conveys UCI including up to 2 bits (for example, HARQ-ACK and/or SR), using 1 or 2 symbols.

PUCCH format 1 is a long PUCCH for UCI including up to 2 bits. The long PUCCH conveys UCI including up to 2 bits, using 4 to 14 symbols. In PUCCH format 1, a plurality of user terminals may be code-division-multiplexed (CDM) within the same PRB, through time-domain block-wise spreading using cyclic shift (CS) and/or orthogonal cover code (OCC), for example.

PUCCH format 2 is a short PUCCH for UCI including more than 2 bits. The short PUCCH conveys UCI including more than 2 bits, using 1 or 2 symbols.

PUCCH format 3 is a long PUCCH for UCI including more than N bits, and a single user terminal is multiplexed within the same PRB. N may be a predetermined value (for example, 2). The long PUCCH conveys UCI including more than N bits (or N bits or more), using 4 to 14 symbols. PUCCH format 3 is different from PUCCH format 4 described below in that a plurality of user terminals are not multiplexed within the same PRB. In PUCCH format 3, OCC may be applied before DFT spreading.

PUCCH format 4 is a long PUCCH for UCI including more than 2 bits, and a plurality of user terminals may be multiplexed within the same PRB. The long PUCCH conveys UCI including more than 2 bits and less than N bits (or up to N bits), using 4 to 14 symbols. In PUCCH format 4, a plurality of user terminals may be code-division-multiplexed within the same PRB, through time-domain block-wise spreading using CS and/or OCC. Alternatively, a plurality of user terminals may be multiplexed, using at least one of (frequency-domain) block-wise spreading before discrete Fourier transform (DFT), frequency division multiplexing (FDM), and comb-like subcarriers (Comb). OCC before DFT spreading may not be applied to PUCCH format 4.

Note that the threshold N for the number of bits of UCI only needs to be an integer of more than 3 (or 3 or more). The threshold N may be defined in a specification, or may be configured by higher layer signaling (for example, at least one of RRC (Radio Resource Control) signaling, and broadcast information (for example, MIB (Master Information Block), system information (for example, SIB (System Information Block), RMSI (Remaining Minimum System Information), and so on))). Alternatively, the threshold N may not be specified.

PUCCH format 4 is different from PUCCH format 3 in that a plurality of user terminals may be multiplexed within the same PRB. Note that the definitions of PUCCH format 3 and PUCCH format 4 may be interchanged, or PUCCH format 3 and PUCCH format 4 may be defined as the same PUCCH format (for example, PUCCH format 3).

Note that, in FIG. 7, N having different values may be used for PUCCH format 3 and PUCCH format 4. For example, N=2 may be used in PUCCH format 3, and N=100 may be used in PUCCH format 4.

(Radio Communication System)

A structure of a radio communication system according to one embodiment of the present invention will be described below. In this radio communication system, communication is performed by using any of the radio communication methods according to the embodiments of the present invention described above, or a combination of these.

Figure 8:
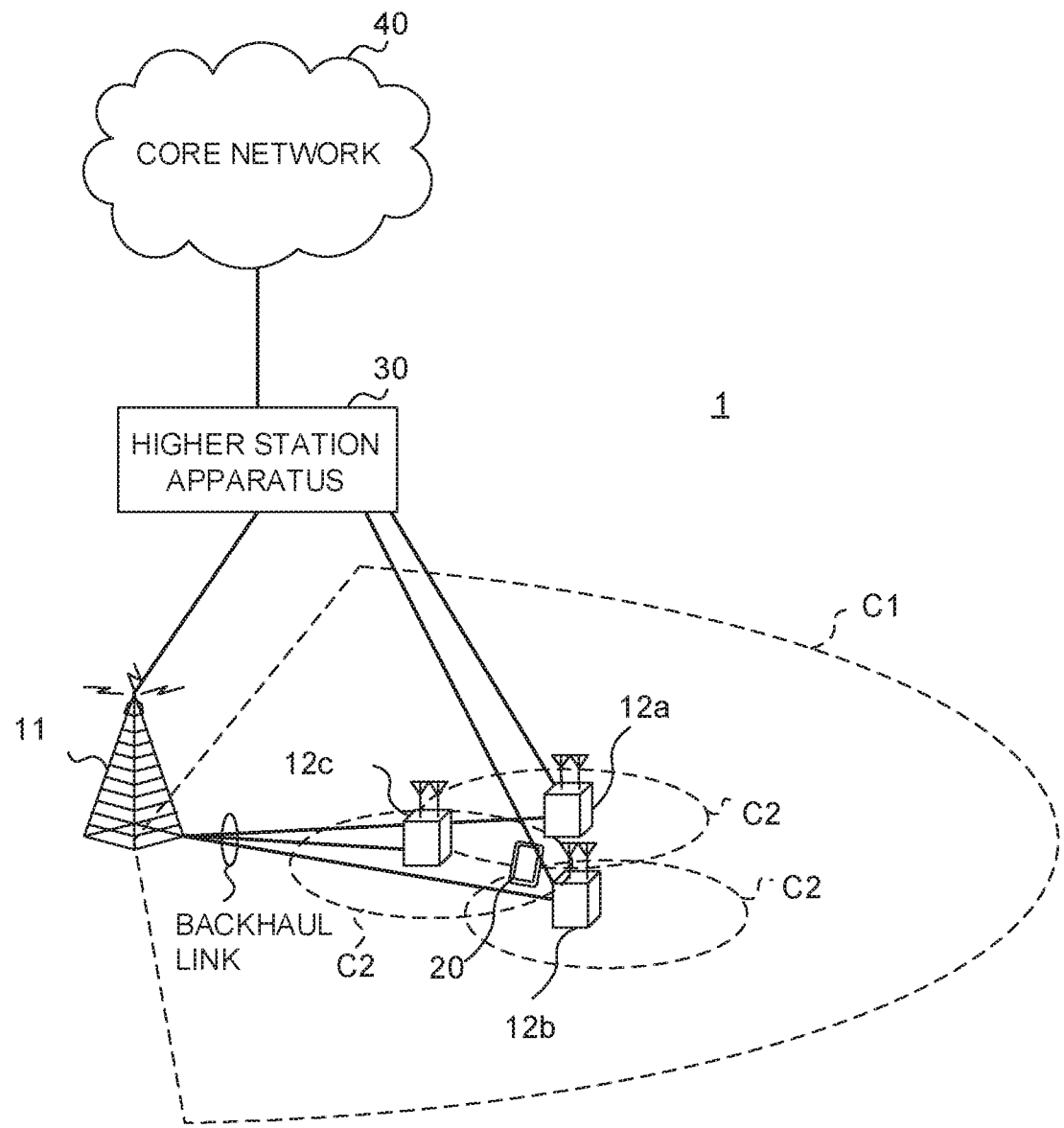
FIG. 8 is a diagram to show an example of a schematic structure of a radio communication system according to the present embodiment.

FIG. 8 is a diagram to show an example of a schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the system bandwidth in LTE systems (for example, 20 MHz) constitutes one unit.

Note that the radio communication system 1 may be referred to as LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), NR (New Radio), FRA (Future Radio Access), New-RAT (Radio Access Technology), or the like, or may be referred to as a system for implementing these.

The radio communication system 1 includes a radio base station 11 that forms a macro cell C1 having a relatively wide coverage, and radio base stations 12 (12a to 12c) that form small cells C2, which are arranged within the macro cell C1 and are narrower than the macro cell C1. Also, user terminals 20 are placed in the macro cell C1 and in each small cell C2. Arrangement, the number, and the like of each of the cells and the user terminals 20 are not limited to those shown in FIG. 8.

The user terminals 20 can connect with both the radio base station 11 and the radio base stations 12. It is assumed that the user terminal 20 uses the macro cell C1 and the small cells C2 at the same time, by using CA or DC. The user terminal 20 may apply CA or DC by using a plurality of cells (CCs) (for example, 5 or less CCs, 6 or more CCs).

Between the user terminals 20 and the radio base station 11, communication can be carried out using a carrier of a relatively low frequency band (for example, 2 GHz) and a narrow bandwidth (also referred to as an existing carrier, a legacy carrier, and so on). Meanwhile, between the user terminals 20 and the radio base stations 12, a carrier of a relatively high frequency band (for example, 3.5 GHz, 5 GHz, and so on) and a wide bandwidth may be used, or the same carrier as that used with the radio base station 11 may be used. Note that the structure of the frequency band for use in each radio base station is by no means limited to these.

A structure may be employed in which wired connection (for example, an optical fiber in compliance with the CPRI (Common Public Radio Interface), an X2 interface, and so on) or wireless connection is established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME), and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point," and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points," and so on. Hereinafter, the radio base stations 11 and 12 will be collectively referred to as "radio base stations 10," unless specified otherwise.

The user terminals 20 are terminals to support various communication schemes such as LTE and LTE-A, and may include not only mobile communication terminals (mobile stations) but also stationary communication terminals (fixed stations).

In the radio communication system 1, as radio access schemes, orthogonal frequency division multiple access (OFDMA) is applied in the downlink, and single carrier frequency division multiple access (SC-FDMA) and/or OFDMA is applied in the uplink.

OFDMA is a multi-carrier communication scheme to perform communication by dividing a frequency band into a plurality of narrow frequency bands (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combinations of these, and other radio access schemes may be used.

In the radio communication system 1, a downlink shared channel (PDSCH (Physical Downlink Shared Channel)), which is used by each user terminal 20 on a shared basis, a broadcast channel (PBCH (Physical Broadcast Channel)), downlink L1/L2 control channels, and so on, are used as downlink channels. User data, higher layer control information, SIBs (System Information Blocks), and so on are communicated in the PDSCH. Also, MIBs (Master Information Blocks) are communicated in the PBCH.

The downlink L1/L2 control channels include a PDCCH (Physical Downlink Control Channel), an EPDCCH (Enhanced Physical Downlink Control Channel)), a PCFICH (Physical Control Format Indicator Channel), a PHICH (Physical Hybrid-ARQ Indicator Channel), and so on. Downlink control information (DCI) including PDSCH and/or PUSCH scheduling information is communicated in the PDCCH, for example.

Note that scheduling information may be notified in DCI. For example, DCI for scheduling DL data reception may be referred to as a DL assignment, and DCI for scheduling UL data transmission may be referred to as a UL grant.

The number of OFDM symbols to use for the PDCCH is communicated in the PCFICH. Transmission confirmation information (for example, also referred to as retransmission control information, a HARQ-ACK, an ACK/NACK, and so on) of a HARQ (Hybrid Automatic Repeat reQuest) for the PUSCH is communicated in the PHICH. The EPDCCH is frequency-division-multiplexed with the PDSCH (downlink shared data channel) and used to communicate DCI and so on, like the PDCCH.

In the radio communication system 1, as uplink channels, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)), and so on are used. User data, higher layer control information, and so on are communicated in the PUSCH. Downlink radio quality information (CQI (Channel Quality Indicator)), transmission confirmation information, a scheduling request (SR), and so on are communicated in the PUCCH. By means of the PRACH, random access preambles for establishing connections with cells are communicated.

In the radio communication system 1, as downlink reference signals, a cell-specific reference signal (CRS), a channel state information-reference signal (CSI-RS), a demodulation reference signal (DMRS), a positioning reference signal (PRS), and so on are communicated. In the radio communication system 1, as uplink reference signals, a sounding reference signal (SRS), a demodulation reference signal (DMRS), and so on are communicated. Note that the DMRS may be referred to as a user terminal-specific reference signal (UE-specific Reference Signal). Communicated reference signals are not limited to these signals.

<Radio Base Station>

Figure 9:
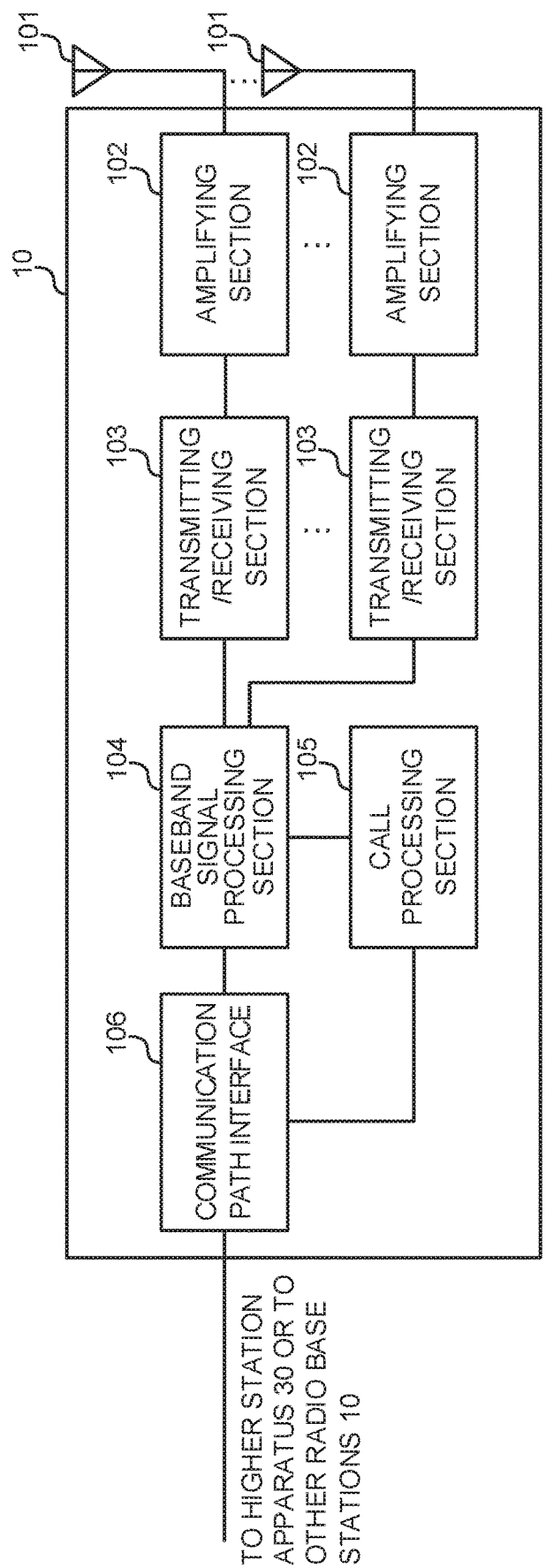
FIG. 9 is a diagram to show an example of an overall structure of a radio base station according to the present embodiment.

FIG. 9 is a diagram to show an example of an overall structure of a radio base station according to one embodiment of the present invention. A radio base station 10 is provided with a plurality of transmitting/receiving antennas 101, amplifying sections 102, transmitting/receiving sections 103, a baseband signal processing section 104, a call processing section 105, and a communication path interface 106. Note that the radio base station 10 may be configured to include one or more transmitting/receiving antennas 101, one or more amplifying sections 102, and one or more transmitting/receiving sections 103.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a precoding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits, or pieces of transmitting/receiving apparatus that can be described based on general understanding of the technical field to which the present invention pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and output to the baseband signal processing section 104.

In the baseband signal processing section 104, user data that is included in the input uplink signals is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (setting up, releasing, and so on) of communication channels, manages the state of the radio base station 10, and manages the radio resources, for example.

The communication path interface 106 transmits and/or receives signals to and/or from the higher station apparatus 30 via a predetermined interface. Also, the communication path interface 106 may transmit and/or receive signals (backhaul signaling) with other radio base stations 10 via an inter-base station interface (for example, an optical fiber in compliance with the CPRI (Common Public Radio Interface) and an X2 interface).

The transmitting/receiving sections 103 receive demodulation reference signals for a UL channel and/or a PUCCH to which a predetermined sequence is applied. The transmitting/receiving sections 103 indicate whether a predetermined group hopping pattern is applied or not (enabled or disabled), by using higher layer signaling (for example, cell-specific and/or UE-specific RRC signaling (RRC parameter), a broadcast signal, and so on). The transmitting/receiving sections 103 may indicate whether CS hopping (CS index hopping) is applied or not (enabled or disabled), by using higher layer signaling.

Figure 10:
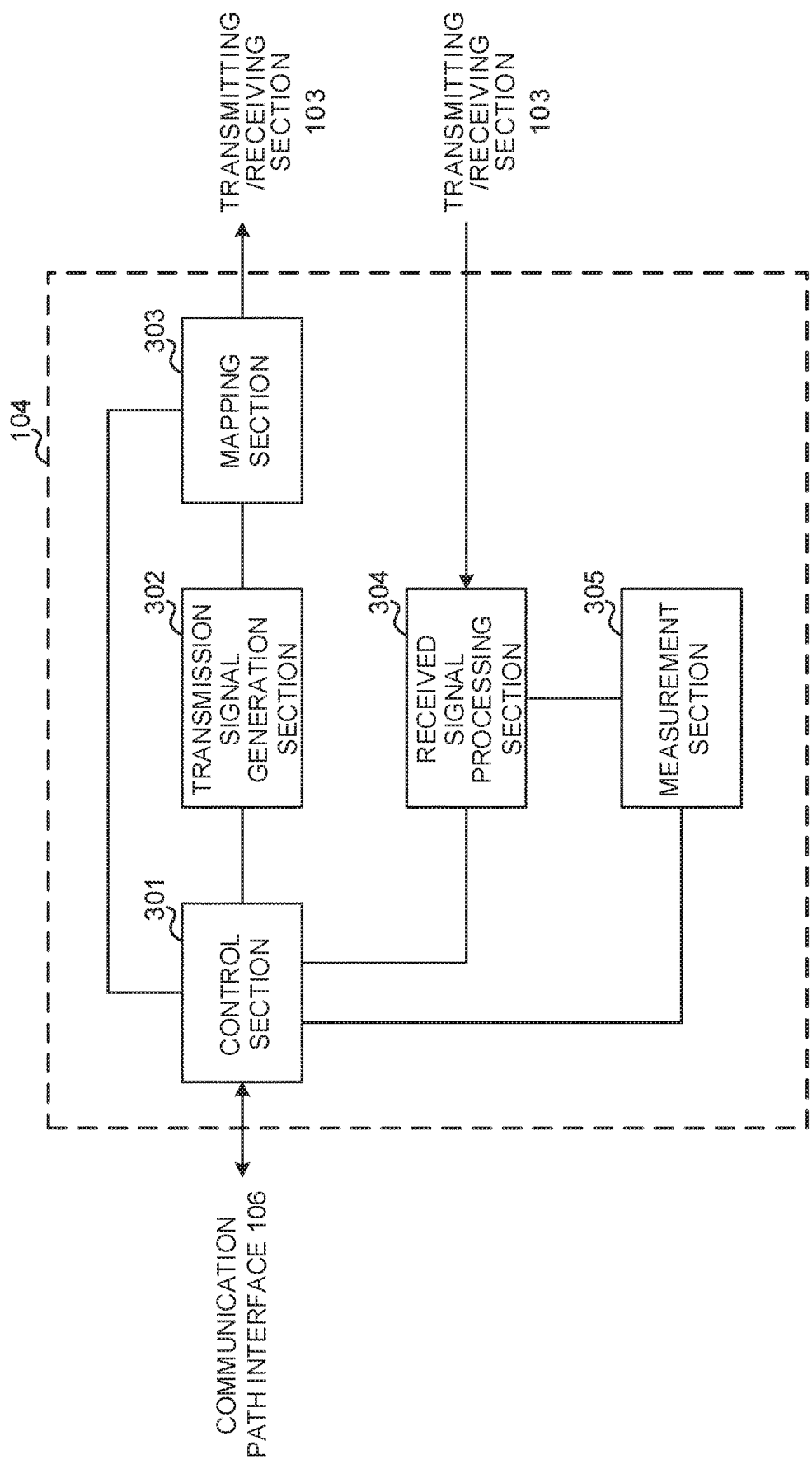
FIG. 10 is a diagram to show an example of a functional structure of the radio base station according to the present embodiment.

FIG. 10 is a diagram to show an example of a functional structure of the radio base station according to one embodiment of the present invention. Note that, although this example primarily shows functional blocks that pertain to characteristic parts of the present embodiment, the radio base station 10 includes other functional blocks that are necessary for radio communication as well.

The baseband signal processing section 104 includes at least a control section (scheduler) 301, a transmission signal generation section 302, a mapping section 303, a received signal processing section 304, and a measurement section 305. Note that these structures only need to be included in the radio base station 10, and a part or all of the structures may not be included in the baseband signal processing section 104.

The control section (scheduler) 301 controls the whole of the radio base station 10. The control section 301 can be constituted with a controller, a control circuit, or control apparatus that can be described based on general understanding of the technical field to which the present invention pertains.

The control section 301 controls, for example, signal generation of the transmission signal generation section 302, signal mapping of the mapping section 303, and so on. The control section 301 controls a signal receiving process of the received signal processing section 304, signal measurement of the measurement section 305, and so on.

The control section 301 controls scheduling (for example, resource allocation) of system information, a downlink data signal (for example, a signal transmitted on the PDSCH), a downlink control signal (for example, a signal transmitted on the PDCCH and/or the EPDCCH, transmission confirmation information, and so on). The control section 301 controls generation of a downlink control signal, a downlink data signal, and so on, based on the results determining whether retransmission control for an uplink data signal is required or not, for example. The control section 301 performs control of scheduling of synchronization signals (for example, PSS (Primary Synchronization Signal)/SSS (Secondary Synchronization Signal)), downlink reference signals (for example, CRS, CSI-RS, and DMRS), and so on.

The control section 301 controls scheduling of an uplink data signal (for example, a signal transmitted on the PUSCH), an uplink control signal (for example, a signal transmitted on the PUCCH and/or the PUSCH, transmission confirmation information, and so on), a random access preamble (for example, a signal transmitted on the PRACH), an uplink reference signal, and so on.

The control section 301 controls whether a predetermined group hopping pattern is applied or not (enabled or disabled). The control section 301 may control whether CS hopping (CS index hopping) is applied or not (enabled or disabled).

The transmission signal generation section 302 generates downlink signals (downlink control signals, downlink data signals, downlink reference signals, and so on), based on commands from the control section 301, and outputs the generated downlink signals to the mapping section 303. The transmission signal generation section 302 can be constituted with a signal generator, a signal generation circuit, or signal generation apparatus that can be described based on general understanding of the technical field to which the present invention pertains.

The transmission signal generation section 302 generates, for example, a DL assignment for notifying downlink data assignment information and/or a UL grant for notifying uplink data assignment information, based on commands from the control section 301. Both the DL assignment and the UL grant are DCI, and follow a DCI format. The downlink data signals are subjected to a coding process and a modulation process, according to a coding rate, a modulation scheme, and so on that is determined based on channel state information (CSI) from each user terminal 20, for example.

The mapping section 303 maps the downlink signals generated in the transmission signal generation section 302 to predetermined radio resources, based on commands from the control section 301, and outputs these to the transmitting/receiving sections 103. The mapping section 303 can be constituted with a mapper, a mapping circuit, or mapping apparatus that can be described based on general understanding of the technical field to which the present invention pertains.

The received signal processing section 304 performs a receiving process (for example, demapping, demodulation, decoding, and so on) on the received signals input from the transmitting/receiving sections 103. Here, the received signals are, for example, uplink signals transmitted from the user terminal 20 (uplink control signals, uplink data signals, uplink reference signals, and so on). The received signal processing section 304 can be constituted with a signal processor, a signal processing circuit, or signal processing apparatus that can be described based on general understanding of the technical field to which the present invention pertains.

The received signal processing section 304 outputs information decoded through the receiving process to the control section 301. For example, when a PUCCH including a HARQ-ACK is received, the HARQ-ACK is output to the control section 301. The received signal processing section 304 outputs the received signals and/or the signals after the receiving process to the measurement section 305.

The measurement section 305 conducts measurements with respect to the received signals. The measurement section 305 can be constituted with a measurer, a measurement circuit, or measurement apparatus that can be described based on general understanding of the technical field to which the present invention pertains.

For example, the measurement section 305 may perform RRM (Radio Resource Management) measurement, CSI (Channel State Information) measurement, and so on, based on the received signals. The measurement section 305 may conduct measurements with respect to reception power (for example, RSRP (Reference Signal Received Power)), reception quality (for example, RSRQ (Reference Signal Received Quality) and SINR (Signal To Interference Plus Noise Ratio)), signal intensity (for example, RSSI (Received Signal Strength Indicator)), channel information (for example, CSI), and so on. The measurement results may be output to the control section 301.

<User Terminal>

Figure 11:
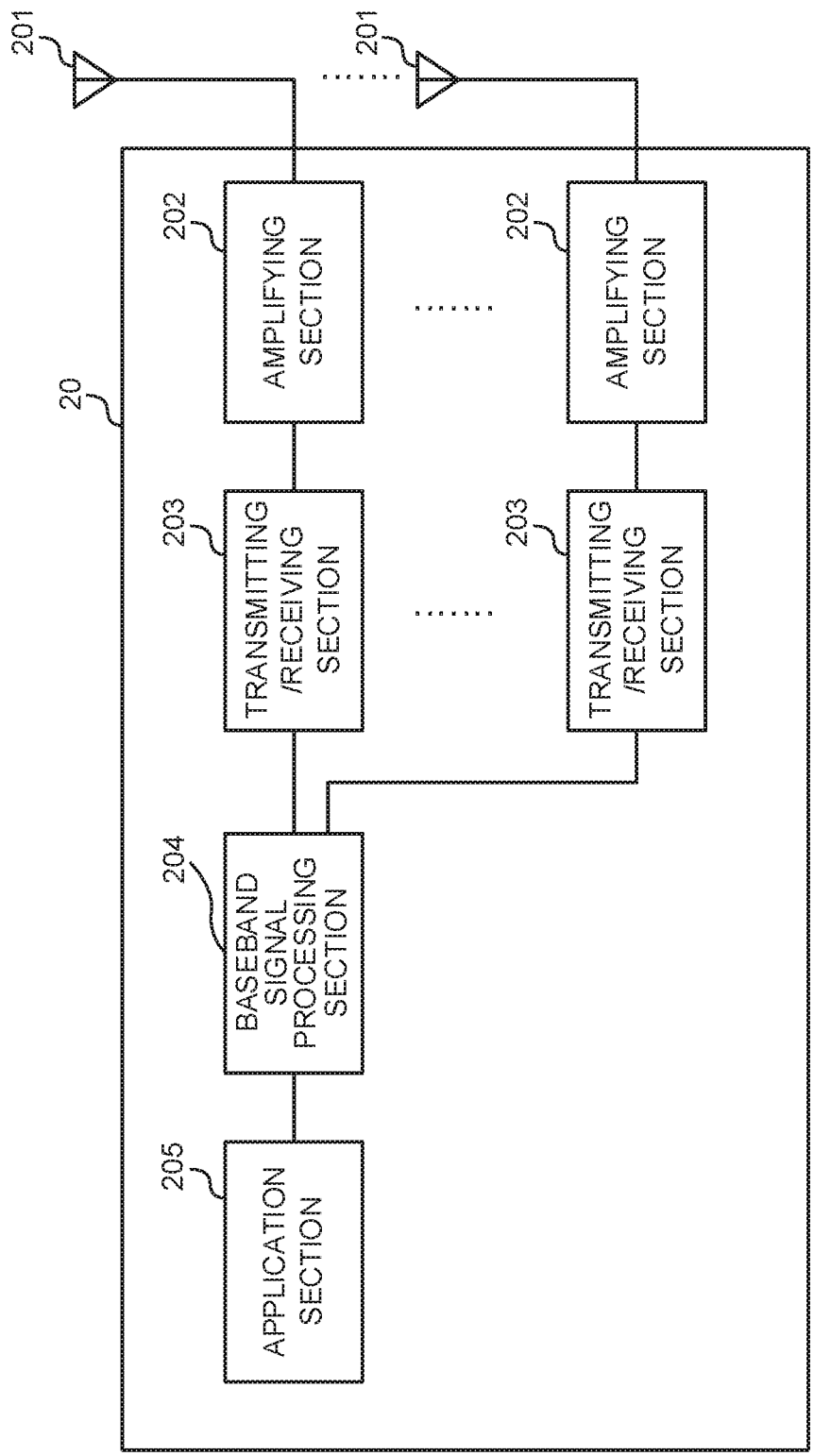
FIG. 11 is a diagram to show an example of an overall structure of a user terminal according to the present embodiment.

FIG. 11 is a diagram to show an example of an overall structure of a user terminal according to one embodiment of the present invention. Each user terminal 20 is provided with a plurality of transmitting/receiving antennas 201, amplifying sections 202, transmitting/receiving sections 203, a baseband signal processing section 204, and an application section 205. Note that the user terminal 20 may be configured to include one or more transmitting/receiving antennas 201, one or more amplifying sections 202, and one or more transmitting/receiving sections 203.

Radio frequency signals that are received in the transmitting/receiving antennas 201 are amplified in the amplifying sections 202. The transmitting/receiving sections 203 receive downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits, or pieces of transmitting/receiving apparatus that can be described based on general understanding of the technical field to which the present invention pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. Broadcast information, out of the downlink data, may also be forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process, and so on, and the result is forwarded to each transmitting/receiving section 203. The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

The transmitting/receiving sections 203 transmit demodulation reference signals for a UL channel and/or a PUCCH to which a predetermined sequence is applied. The transmitting/receiving sections 203 receive information related to whether a predetermined group hopping pattern is applied or not (enabled or disabled), by using higher layer signaling (for example, cell-specific and/or UE-specific RRC signaling (RRC parameter), a broadcast signal, and so on). The transmitting/receiving sections 203 may receive information related to whether CS hopping (CS index hopping) is applied or not (enabled or disabled), by using higher layer signaling.

Figure 12:
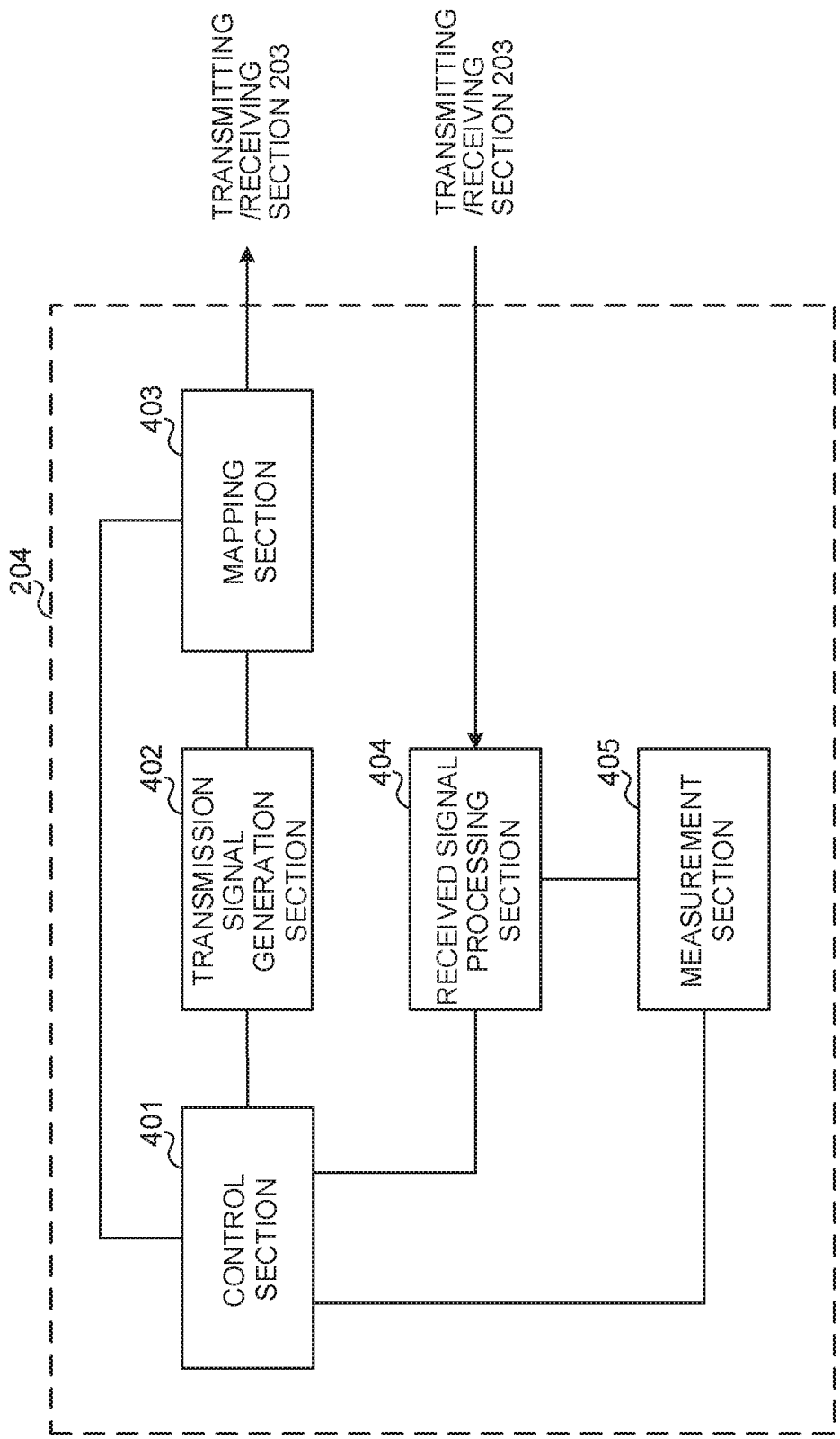
FIG. 12 is a diagram to show an example of a functional structure of the user terminal according to the present embodiment.

FIG. 12 is a diagram to show an example of a functional structure of the user terminal according to one embodiment of the present invention. Note that, although this example primarily shows functional blocks that pertain to characteristic parts of the present embodiment, the user terminal 20 includes other functional blocks that are necessary for radio communication as well.

The baseband signal processing section 204 included in the user terminal 20 includes at least a control section 401, a transmission signal generation section 402, a mapping section 403, a received signal processing section 404, and a measurement section 405. Note that these structures only need to be included in the user terminal 20, and a part or all of the structures may not be included in the baseband signal processing section 204.

The control section 401 controls the whole of the user terminal 20. The control section 401 can be constituted with a controller, a control circuit, or control apparatus that can be described based on general understanding of the technical field to which the present invention pertains.

The control section 401 controls, for example, signal generation of the transmission signal generation section 402, signal mapping of the mapping section 403, and so on. The control section 401 controls a signal receiving process of the received signal processing section 404, signal measurement of the measurement section 405, and so on.

The control section 401 acquires the downlink control signals and the downlink data signals transmitted from the radio base station 10, through the received signal processing section 404. The control section 401 controls generation of an uplink control signal and/or an uplink data signal, based on the results determining whether retransmission control for the downlink control signal and/or the downlink data signal is required or not, for example.

The control section 401 controls a predetermined sequence to be applied to a demodulation reference signal and/or an uplink control channel, based on at least a symbol index and/or a frequency resource index. The control section 401 applies at least one of hopping at slot level, hopping at symbol level, and hopping at frequency resource level, to the predetermined sequence.

For example, the control section 401 may control enabling or disabling of hopping at slot level and hopping at symbol level, based on a notification from a base station, and may apply hopping at frequency resource level, irrespective of a notification from a base station. Alternatively, the control section 401 may control enabling or disabling of hopping at slot level, based on a notification from a base station, and may apply hopping at symbol level and hopping at frequency resource level, irrespective of a notification from a base station.

The control section 401 may control cyclic shift to be applied to a predetermined sequence, based on at least a symbol index and/or a frequency resource index.

The transmission signal generation section 402 generates uplink signals (uplink control signals, uplink data signals, uplink reference signals, and so on), based on commands from the control section 401, and outputs the generated uplink signals to the mapping section 403. The transmission signal generation section 402 can be constituted with a signal generator, a signal generation circuit, or signal generation apparatus that can be described based on general understanding of the technical field to which the present invention pertains.

The transmission signal generation section 402 generates, for example, uplink control signals related to transmission confirmation information, channel state information (CSI), and so on, based on commands from the control section 401. The transmission signal generation section 402 also generates uplink data signals, based on a command from the control section 401. For example, when downlink control signals notified from the radio base station 10 include a UL grant, the transmission signal generation section 402 is given a command to generate uplink data signals from the control section 401.

The mapping section 403 maps the uplink signals generated in the transmission signal generation section 402 to radio resources, based on commands from the control section 401, and outputs these to the transmitting/receiving sections 203. The mapping section 403 can be constituted with a mapper, a mapping circuit, or mapping apparatus that can be described based on general understanding of the technical field to which the present invention pertains.

The received signal processing section 404 performs a receiving process (for example, demapping, demodulation, decoding, and so on) on the received signals input from the transmitting/receiving sections 203. Here, the received signals are, for example, downlink signals (downlink control signals, downlink data signals, downlink reference signals, and so on) transmitted from the radio base station 10. The received signal processing section 404 can be constituted with a signal processor, a signal processing circuit, or signal processing apparatus that can be described based on general understanding of the technical field to which the present invention pertains. Also, the received signal processing section 404 can constitute a receiving section according to the present invention.

The received signal processing section 404 outputs information decoded through the receiving process to the control section 401. The received signal processing section 404 outputs, for example, broadcast information, system information, RRC signaling, DCI, and so on to the control section 401. The received signal processing section 404 outputs the received signals and/or the signals after the receiving process to the measurement section 405.

The measurement section 405 conducts measurements with respect to the received signals. The measurement section 405 can be constituted with a measurer, a measurement circuit, or measurement apparatus that can be described based on general understanding of the technical field to which the present invention pertains.

For example, the measurement section 405 may conduct RRM measurement, CSI measurement, and so on, based on the received signals. The measurement section 405 may conduct measurements with respect to received power (for example, RSRP), reception quality (for example, RSRQ and SINR), signal intensity (for example, RSSI), channel information (for example, CSI), and so on. The measurement results may be output to the control section 401.

<Hardware Structure>

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these plurality of pieces of apparatus.

Figure 13:
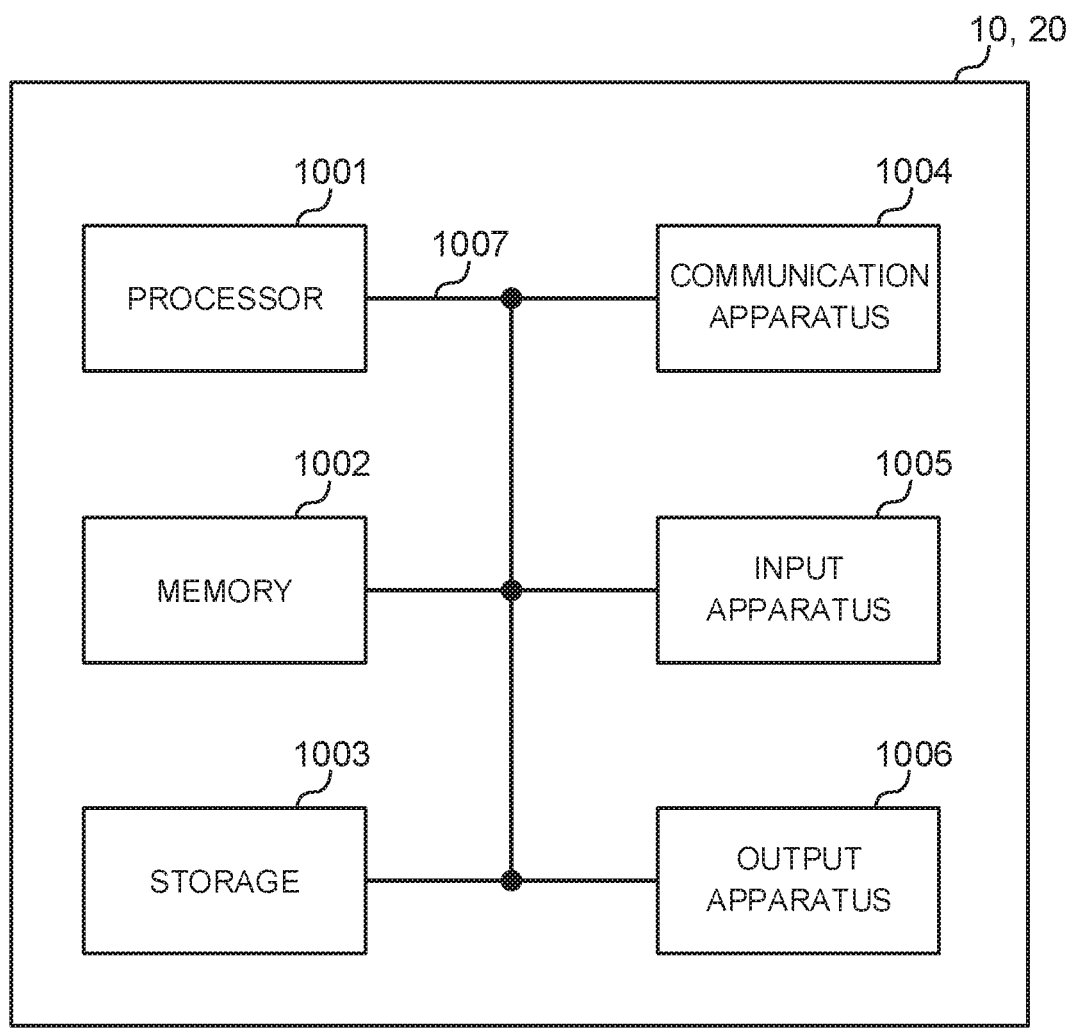
FIG. 13 is a diagram to show an example of a hardware structure of the radio base station and the user terminal according to the present embodiment.

For example, a radio base station, a user terminal, and so on according to one embodiment of the present invention may function as a computer that executes the processes of the radio communication method of the present invention. FIG. 13 is a diagram to show an example of a hardware structure of the radio base station and the user terminal according to one embodiment of the present invention. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or more of apparatuses shown in the drawings, or may be designed not to include part of apparatuses.

For example, although only one processor 1001 is shown, a plurality of processors may be provided. Furthermore, processes may be implemented with one processor or may be implemented at the same time, in sequence, or in different manners with one or more processors. Note that the processor 1001 may be implemented with one or more chips.

Each function of the radio base station 10 and the user terminals 20 is implemented, for example, by allowing predetermined software (programs) to be read on hardware such as the processor 1001 and the memory 1002, and by allowing the processor 1001 to perform calculations to control communication via the communication apparatus 1004 and read and/or write data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from the storage 1003 and/or the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (read only memory), an EPROM (erasable programmable ROM), an EEPROM (electrically EPROM), a RAM (random access memory), and other appropriate storage media. The memory 1002 may be referred to as a "register," a "cache," a "main memory (primary storage apparatus)," and so on. The memory 1002 can store executable programs (program codes), software modules, and/or the like for implementing a radio communication method according to one embodiment of the present invention.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via wired and/or wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application-Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology used in this specification and/or the terminology that is needed to understand this specification may be replaced by other terms that convey the same or similar meanings. For example, "channels" and/or "symbols" may be replaced by "signals" ("signaling"). Also, "signals" may be "messages." A reference signal may be abbreviated as an "RS," and may be referred to as a "pilot," a "pilot signal", and so on, depending on which standard applies. Furthermore, a "component carrier (CC)" may be referred to as a "cell," a "frequency carrier," a "carrier frequency," and so on.

Furthermore, a radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may have a fixed time length (for example, 1 ms) independent of numerology.

Furthermore, a slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology. A slot may include a plurality of mini-slots. Each mini-slot may be constituted of one or a plurality of symbols in the time domain. A mini-slot may be referred to as a "sub-slot."

A radio frame, a subframe, a slot, a mini-slot, and a symbol all express time units in signal communication. A radio frame, a subframe, a slot, a mini-slot, and a symbol may each be called by other applicable terms. For example, one subframe may be referred to as a "transmission time interval (TTI)," a plurality of consecutive subframes may be referred to as a "TTI," or one slot or one mini-slot may be referred to as a "TTI." That is, a subframe and/or a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, and/or codewords, or may be the unit of processing in scheduling, link adaptation, and so on. Note that, when TTIs are given, the time interval (for example, the number of symbols) to which transport blocks, code blocks and/or codewords are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe," and so on. A TTI that is shorter than a normal TTI may be referred to as a "shortened TTI," a "short TTI," a "partial or fractional TTI," a "shortened subframe," a "short subframe," a "mini-slot," a "sub-slot," and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 MS.

A resource block (RB) is the unit of resource allocation in the time domain and the frequency domain, and may include one or a plurality of consecutive subcarriers in the frequency domain. Also, an RB may include one or a plurality of symbols in the time domain, and may be one slot, one mini-slot, one subframe, or one TTI in length. One TTI and one subframe each may be constituted of one or a plurality of resource blocks. Note that one or a plurality of RBs may be referred to as a "physical resource block (PRB (Physical RB))," a "sub-carrier group (SCG)," a "resource element group (REG)," a "PRB pair," an "RB pair," and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in this specification may be represented in absolute values or in relative values with respect to predetermined values, or may be represented in another corresponding information. For example, radio resources may be specified by predetermined indexes.

The names used for parameters and so on in this specification are in no respect limiting. For example, since various channels (PUCCH (Physical Uplink Control Channel), PDCCH (Physical Downlink Control Channel), and so on) and information elements can be identified by any suitable names, the various names assigned to these individual channels and information elements are in no respect limiting.

The information, signals, and/or others described in this specification may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers and/or from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of predetermined information (for example, reporting of "X holds") does not necessarily have to be reported explicitly, and can be reported implicitly (by, for example, not reporting this predetermined information or reporting another piece of information).

Determinations may be made in values represented by one bit (0 or 1), may be made in Boolean values that represent true or false, or may be made by comparing numerical values (for example, comparison against a predetermined value).

Software, whether referred to as "software," "firmware," "middleware," "microcode," or "hardware description language," or called by other names, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" as used herein are used interchangeably.

In the present specification, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell," and so on.

A base station can accommodate one or a plurality of (for example, three) cells (also referred to as "sectors"). When a base station accommodates a plurality of cells, the entire coverage area of the base station can be partitioned into a plurality of smaller areas, and each smaller area can provide communication services through base station subsystems (for example, indoor small base stations (RRHs (Remote Radio Heads))). The term "cell" or "sector" refers to part of or the entire coverage area of a base station and/or a base station subsystem that provides communication services within this coverage.

In the present specification, the terms "mobile station (MS)," "user terminal," "user equipment (UE)," and "terminal" may be used interchangeably. A base station may be referred to as a "fixed station," "NodeB," "eNodeB (eNB)," "access point," "transmission point," "receiving point," "femto cell," "small cell," and so on.

Depending on a person skilled in the art, a mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, the user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Actions which have been described in this specification to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts, and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these.

The phrase "based on" (or "on the basis of") as used in this specification does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used herein does not generally limit the quantity or order of these elements. These designations may be used herein only for convenience, as a method for distinguishing between two or more elements. Thus, reference to the first and second elements does not imply that only two elements may be employed, or that the first element must precede the second element in some way.

The term "judging (determining)" as used herein may encompass a wide variety of actions. For example, "judging (determining)" may be interpreted to mean making "judgments (determinations)" about calculating, computing, processing, deriving, investigating, looking up (for example, searching a table, a database, or some other data structures), ascertaining, and so on. Furthermore, "judging (determining)" may be interpreted to mean making "judgments (determinations)" about receiving (for example, receiving information), transmitting (for example, transmitting information), input, output, accessing (for example, accessing data in a memory), and so on. In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

The terms "connected" and "coupled," or any variation of these terms as used herein mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In this specification, when two elements are connected, the two elements may be considered "connected" or "coupled" to each other by using one or more electrical wires, cables and/or printed electrical connections, and, as some non-limiting and non-inclusive examples, by using electromagnetic energy having wavelengths in radio frequency regions, microwave regions, (both visible and invisible) optical regions, or the like.

In this specification, the phrase "A and B are different" may mean that "A and B are different from each other." The terms "separate," "be coupled," and so on may be interpreted similarly.

When terms such as "including," "comprising," and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

What is claimed is:

1. A terminal comprising:
    a receiver that receives a higher layer parameter that indicates whether group hopping is to be enabled or disabled;
    a processor that determines, in a case where the group hopping is enabled, a group number of a sequence for a demodulation reference signal for an uplink shared channel based on a symbol index and a slot index; and
    a transmitter that transmits the demodulation reference signal,
    wherein the processor determines the group number based on a pseudo-random sequence c(N+i), and
    wherein the variable N of the pseudo-random sequence c(N+i) is based on the symbol index and the slot index.

2. A radio communication method comprising:
    receiving a higher layer parameter that indicates whether group hopping is to be enabled or disabled;
    determining, in a case where the group hopping is enabled, a group number of a sequence for a demodulation reference signal for an uplink shared channel based on a symbol index and a slot index; and
    transmitting the demodulation reference signal,
    wherein the group number is determined based on a pseudo-random sequence c(N+i), and
    wherein the variable N of the pseudo-random sequence c(N+i) is based on the symbol index and the slot index.

3. A base station comprising:
    a transmitter that transmits a higher layer parameter that indicates whether group hopping is to be enabled or disabled; and
    a receiver that receives a demodulation reference signal for an uplink shared channel, a group number of a sequence for the demodulation reference signal being determined based on a symbol index and a slot index in a case where group hopping is enabled,
    wherein the group number is determined based on a pseudo-random sequence c(N+i), and
    wherein the variable N of the pseudo-random sequence c(N+i) is based on the symbol index and the slot index.

4. A system comprising a terminal and a base station, wherein:
    the terminal comprises:
        a receiver that receives a higher layer parameter that indicates whether group hopping is to be enabled or disabled;
        a processor that determines, in a case where the group hopping is enabled, a group number of a sequence for a demodulation reference signal for an uplink shared channel based on a symbol index and a slot index; and
        a transmitter that transmits the demodulation reference signal, and the base station comprises:
        a receiver that receives the demodulation reference signal,
    wherein the processor determines the group number based on a pseudo-random sequence c(N+i), and
    wherein the variable N of the pseudo-random sequence c(N+i) is based on the symbol index and the slot index.

* * * * *